(12) United States Patent
Ravi et al.

(10) Patent No.: US 10,017,687 B2
(45) Date of Patent: Jul. 10, 2018

(54) ULTRA-LIGHT ULTRA-STRONG PROPPANTS

(71) Applicant: CALIFORNIA INSTITUTE OF TECHNOLOGY, Pasadena, CA (US)

(72) Inventors: Vilupanur A. Ravi, Claremont, CA (US); Samad A. Firdosy, La Crescenta, CA (US); Jean-Pierre Fleurial, Altadena, CA (US); Sabah K. Bux, Chino Hills, CA (US); Andrew Kindler, San Marino, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 91 days.

(21) Appl. No.: 14/712,888

(22) Filed: May 14, 2015

(65) Prior Publication Data

US 2015/0329769 A1    Nov. 19, 2015

Related U.S. Application Data

(60) Provisional application No. 61/993,187, filed on May 14, 2014.

(51) Int. Cl.

| | |
|---|---|
| C09K 8/80 | (2006.01) |
| C04B 35/622 | (2006.01) |
| C04B 35/653 | (2006.01) |
| C04B 35/628 | (2006.01) |
| C04B 33/135 | (2006.01) |
| C04B 33/138 | (2006.01) |
| C04B 33/32 | (2006.01) |
| C04B 35/04 | (2006.01) |
| C04B 35/58 | (2006.01) |
| C04B 35/626 | (2006.01) |
| C04B 35/645 | (2006.01) |
| C04B 38/00 | (2006.01) |

(52) U.S. Cl.
CPC .......... *C09K 8/805* (2013.01); *C04B 33/138* (2013.01); *C04B 33/1352* (2013.01); *C04B 33/32* (2013.01); *C04B 33/323* (2013.01); *C04B 35/04* (2013.01); *C04B 35/58007* (2013.01); *C04B 35/628* (2013.01); *C04B 35/62204* (2013.01); *C04B 35/62655* (2013.01); *C04B 35/645* (2013.01); *C04B 35/653* (2013.01); *C04B 38/009* (2013.01); *C09K 8/80* (2013.01); *C04B 2235/3217* (2013.01); *C04B 2235/5427* (2013.01); *C04B 2235/6562* (2013.01); *C04B 2235/6565* (2013.01); *C04B 2235/6586* (2013.01); *C04B 2235/77* (2013.01); *C04B 2235/80* (2013.01); *C04B 2235/94* (2013.01); *C04B 2235/96* (2013.01); *Y02P 40/69* (2015.11)

(58) Field of Classification Search
CPC . C09K 8/80; C09K 8/68; C09K 8/805; C09K 8/62; C09K 8/035; C09K 8/685; C09K 8/887; C09K 8/665; C09K 8/70; C09K 8/74; C09K 2208/08; C09K 8/52; C09K 8/725; C09K 8/882; C09K 8/90; C09K 2208/02; C09K 8/032; C09K 8/42; C09K 8/592; C09K 8/594; C09K 8/60; C09K 8/72; C09K 8/92; C09K 2208/00; C09K 2208/12; C09K 2208/26; C09K 3/22; C09K 8/03; C09K 8/04; C09K 8/06; C09K 8/08; C09K 8/12; C09K 8/20; C09K 8/26; C09K 8/34; C09K 8/38; C09K 8/40; C09K 8/426; C09K 8/46; C09K 8/467; C09K 8/502; C09K 8/5045; C09K 8/506; C09K 8/512; C09K 8/514; C09K 8/516; C09K 8/524; C09K 8/536
See application file for complete search history.

(56) References Cited

U.S. PATENT DOCUMENTS

| | | | |
|---|---|---|---|
| 2,149,688 A | 3/1939 | Schott | |
| 3,245,866 A * | 4/1966 | Schott | ............... E21B 43/267 166/280.1 |

(Continued)

FOREIGN PATENT DOCUMENTS

| | | |
|---|---|---|
| WO | 2006/079208 A1 | 8/2006 |
| WO | 2015175853 | 11/2015 |

OTHER PUBLICATIONS

Chen et. al. Synthesis of (Ca, Mg)-α-sialon slag by self-propagating high-temperature synthesis, J. Mater. Chem., 2002, 12, 1199-1202.*
http://www.sigmaaldrich.com/chemistry/stockroom-reagents/learning-center/technical-lib . . . downloaded on Oct. 12, 2016.*
http://www.engineeringtoolbox.com/air-composition-d_212.html downloaded on Aug. 9, 2017.*
Chen et. al. Synthesis of (Ca, Mg)-a-sialon slag by self-propagating high-temperature synthesis, J. Mater. Chem., 2002, 12, 1199-1202.*
International Search Report and Written Opinion dated Aug. 31, 2015 in PCT/US2015/030918, 12 pages.
Swanson and Cutler, Trans. ASME, 105 (1983) pp. 128-133.
R. A. Cutler et al., Society of Petroleum Engineers Journal, 25 (1985) pp. 157-170.

(Continued)

*Primary Examiner* — Kumar R Bhushan
(74) *Attorney, Agent, or Firm* — Mintz, Levin, Cohn, Ferris, Glovsky and Popeo, P.C.

(57) ABSTRACT

The present invention provides a method of preparing a proppant material by heating a reaction mixture comprising a plurality of oxides in a reactive atmosphere to a temperature above the melting point of the reaction mixture to form a melt, and then allowing the melt to solidify in a mold in the form of spherical particles. The present invention also provides a method of preparing a proppant material by heating a reaction mixture comprising a plurality of oxides and one or more additives in a reactive atmosphere to a temperature below the melting point of the reaction mixture to form a powder including one or more reaction products, and then processing the powder to form spherical particles. The present invention also provides a proppant material including spherical particles characterized by a specific gravity of about 1.0 to 3.0 and a crush strength of at least about 10,000 psi.

20 Claims, 14 Drawing Sheets

(56) References Cited

U.S. PATENT DOCUMENTS

| | | | |
|---|---|---|---|
| 6,342,461 B1* | 1/2002 | Lee | C04B 33/1327 501/141 |
| 7,160,844 B2 | 1/2007 | Urbanek | |
| 2008/0087136 A1 | 4/2008 | Ek | |
| 2010/0032159 A1* | 2/2010 | Saini | C09K 8/62 166/278 |
| 2010/0068521 A1 | 3/2010 | Koseski et al. | |
| 2010/0252263 A1 | 10/2010 | Silva et al. | |
| 2011/0111990 A1 | 5/2011 | Pershikova et al. | |
| 2012/0118574 A1 | 5/2012 | Li et al. | |
| 2013/0206408 A1* | 8/2013 | Chatterjee | C04B 33/1352 166/280.1 |

OTHER PUBLICATIONS

Cemex USA product information, [online], [retrieved from the internet], retrieved on Oct. 23, 2015, <URL : http://www.cemexusa.com/ProductsServices/FlyAshTypes.aspx>, 2 pages.

Barbara Horwitz-Bennet, "The truth about fly ash," [online], Feb. 6, 2015, <URL: http://www.greenbuildermag.com/news/green-building/the-truth-about-fly-ash#.sthash.hO8qwD3f.dpuf>, 2 pages.

Hendrik G. van Oss, "Slag-Iron and Steel," Dec. 2007, U.S. Department of the Interior U.S. Geological Survey, 8 pages.

Euroslag product information, [online], [retrieved from the internet], retrieved on Oct. 23, 2015, <URL : http://www.euroslag.com/products/properties>, 3 pages.

C.P. Broadbent, "Internal structure of solidified iron blast-furnace slag (BFS) droplets formed by self-impinging jets," J. Materials Science and Letters, 6, (1987) pp. 1264-1266.

Jun Bin Wu et al., Advanced Materials Research (2010), 113-116, pp. 1653-1656.

Y.B. Cheng, Key Engineering Materials, (2004), 264-268, pp. 781-786.

Chen et al, "Synthesis of (Ca, Mg)-α-sialon from slag by self-propagating high-temperature synthesis", J. Mater. Chem., (2002) 12, pp. 1199-1202.

E. Fidancevska et al., "Obtaining of dense and highly porous ceramic materials from metallurgical slag", Science of Sintering, (2003), 35, pp. 85-91.

R. Adziski et al., "Industrial waste as a source for fabrication of composite ceramic-glass with controlled porosity," Science of Sintering (2008), 40, pp. 89-96.

A. A. Kudyba-Jansen et al., "Ca-α/β-sialon ceramics synthesized from fly ash—preparation, characterization and properties," Materials Research Bulletin 36 (2001), pp. 1215-1230.

Q. Qiu et al. "Carbonitridation of Fly Ash. I. Synthesis of SiAION-Based Materials", Ind. Eng. Chem. Res., (2005), 44, pp. 2469-2476.

K. Komeya et al. "Hollow Beads Composed of Nanosize Ca alpha-SiAION Grains", J. American, Ceramic Society, (2000), 83, 4, pp. 995-997.

P. T. Vasudevan and F. Zhang, Applied Catalysis A: General 112 (1994), pp. 161-173.

F. Iskandar, Mikrajuddin and K. Okuyama, Nano Letters (2001), 1, pp. 231-234.

T.W. Clyne, et al., Philosophical Transactions of the Royal Society A: Mathematical, Physical and Engineering Sciences (2006), 364, pp. 109-124.

E. S. Toberer and R. Seshadri, Chemical Communications (2006), pp. 3159-3165.

R. G. Blair, A. Anderson and R. B. Kaner, Chemistry of Materials (2005), 17, pp. 2155-2161.

A. Gaurav, et al., Journal of Petroleum Science and Engineering (2012), 92-93, pp. 82-88.

W. Luscher, International Journal of Applied Ceramic Technology (2006), 3 [2], pp. 157-165.

Joshua M. Boyce, "Synthesis of Cementiously Bonded Aggregates,"Thesis, The Pennsylvania State University, Aug. 2008.

S. K. Bux, M. T. Yeung, E. S. Toberer, G. J. Snyder, R. B. Kaner, and J. P. Fleurial, J. Mater. Chem. (2011), 21, pp. 12259-12266.

A. J. Anderson, R. G. Blair, S. M. Hick, and R. B. Kaner, J. Mater. Chem. (2006), 16, pp. 1318-1322.

S. K. Bux, R. G. Blair, P. K. Gogna, H. Lee, G. Chen, M. S. Dresselhaus, R. B. Kaner, and J. P. Fleurial, Adv. Funct. Mater. (2009), 19, pp. 2445-2452.

J. Yang, Y. Beppu, G. Zhang, T. Ohji, and S. Kanzaki, J. Am. Ceram. Soc. (2002), 85, pp. 1879-1881.

R. P. Koseski, "Manipulation of Microstructure, Phse Evolution and Mechanical Properties by Devitrification of Andesite for Use as Proppant." Thesis, The Pennsylvania State University, Dec. 2008.

Wu and Wu, Corrosion Science (2012), 63, pp. 399-403.

PCT/US2015/030918 , "International Preliminary Report on Patentability", dated Nov. 24, 2016, 9 pages.

* cited by examiner

XRF elemental analysis (weight %)

| Spectrum Label | Na | Mg | Al | Si | S | K | Ca | Ti | V | Cr | Mn | Fe | Sr | Zr | Total |
|---|---|---|---|---|---|---|---|---|---|---|---|---|---|---|---|
| AC-BF2 | 0.82 | 10.51 | 9.15 | 37.37 | 2 | 0.77 | 37.21 | 0.64 | 0.02 | 0.1 | 0.87 | 0.4 | 0.08 | 0.04 | 100 |
| AC-BF1 | 0.29 | 10.73 | 9.3 | 37.58 | 2 | 0.7 | 37.25 | 0.65 | 0.01 | 0.11 | 0.86 | 0.4 | 0.09 | 0.04 | 100 |
| AC-BF3 | 0.97 | 10.83 | 9.19 | 37.38 | 1.98 | 0.74 | 36.81 | 0.63 | 0.01 | 0.09 | 0.85 | 0.4 | 0.09 | 0.04 | 100 |

XRF elemental analysis calculated as oxides (weight %)

| Spectrum Label | Na2O | MgO | Al2O3 | SiO2 | SO3 | K2O | CaO | TiO2 | V2O5 | Cr2O3 | MnO2 | Fe2O3 | SrO | ZrO2 | Total |
|---|---|---|---|---|---|---|---|---|---|---|---|---|---|---|---|
| AC-BF2 | 0.83 | 12.62 | 11.28 | 47.63 | 2.52 | 0.44 | 23.41 | 0.41 | 0.01 | 0.05 | 0.52 | 0.22 | 0.04 | 0.02 | 100 |
| AC-BF1 | 0.29 | 12.91 | 11.46 | 47.8 | 2.51 | 0.4 | 23.37 | 0.41 | 0.01 | 0.06 | 0.51 | 0.21 | 0.04 | 0.02 | 100 |
| AC-BF3 | 0.98 | 12.99 | 11.29 | 47.49 | 2.49 | 0.43 | 23.1 | 0.4 | 0 | 0.05 | 0.51 | 0.21 | 0.04 | 0.02 | 100 |

Optical photograph of slag chunk (scale bar in mm)

XRD pattern for air cooled slag

XRF elemental analysis (weight %)
| Spectrum Label | Na | Mg | Al | Si | S | K | Ca | Ti | V | Cr | Mn | Fe | Sr | Zr | Total |
|---|---|---|---|---|---|---|---|---|---|---|---|---|---|---|---|
| Pel-BF1 | 0.11 | 10.77 | 8.5 | 32.64 | 2.43 | 0.57 | 41.67 | 0.65 | 0 | 0.1 | 0.66 | 1.75 | 0.09 | 0.07 | 100 |
| Pel-BF2 | 0.56 | 10.99 | 6.12 | 32.85 | 3.55 | 0.66 | 40.49 | 0.68 | 0.01 | 0.11 | 0.77 | 1.07 | 0.08 | 0.06 | 100 |
| Pel-BF3 | 0.35 | 9.78 | 7.99 | 31.67 | 2.16 | 0.64 | 45.31 | 0.66 | 0.01 | 0.11 | 0.53 | 0.59 | 0.13 | 0.08 | 100 |
*Figure 3A*
XRF elemental analysis calculated as oxides (weight %)
| Spectrum Label | Na2O | MgO | Al2O3 | SiO2 | SO3 | K2O | CaO | TiO2 | V2O5 | Cr2O3 | MnO2 | Fe2O3 | SrO | ZrO2 | Total |
|---|---|---|---|---|---|---|---|---|---|---|---|---|---|---|---|
| Pel-BF1 | 0.11 | 13.01 | 10.67 | 43 | 3.24 | 0.35 | 27.65 | 0.44 | 0 | 0.06 | 0.42 | 0.99 | 0.04 | 0.04 | 100 |
| Pel-BF2 | 0.56 | 13.24 | 10.11 | 42.95 | 4.68 | 0.4 | 26.39 | 0.45 | 0.01 | 0.06 | 0.48 | 0.59 | 0.04 | 0.03 | 100 |
| Pel-BF3 | 0.35 | 11.91 | 10.18 | 42.48 | 2.94 | 0.4 | 30.45 | 0.45 | 0 | 0.06 | 0.33 | 0.34 | 0.06 | 0.04 | 100 |
*Figure 3B*
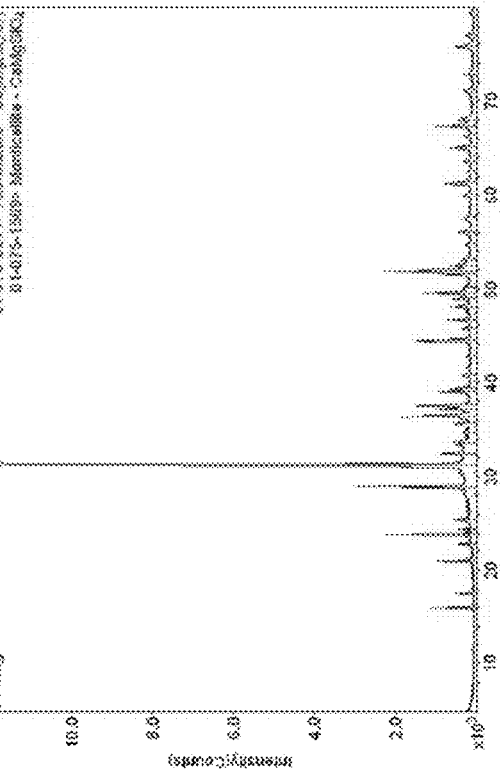
Optical photograph of pelletized slag (scale bar in mm)
*Figure 3D*
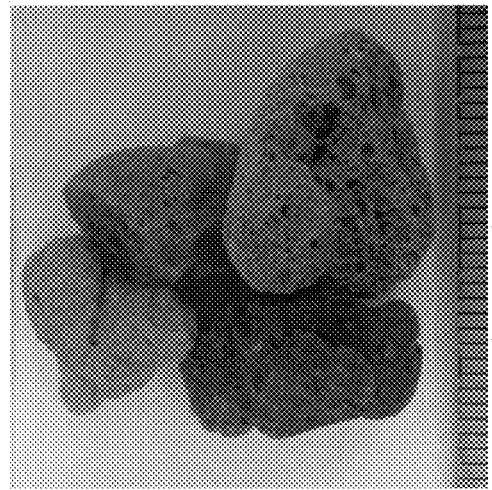
XRD pattern for pelletized slag
*Figure 3C*

XRF elemental analysis (weight %)
| Spectrum Label | Na | Mg | Al | Si | S | K | Ca | Ti | V | Cr | Mn | Fe | Sr | Zr | Total |
|---|---|---|---|---|---|---|---|---|---|---|---|---|---|---|---|
| gran-BF1 | 0.6 | 8.83 | 8.55 | 33.83 | 1.96 | 1.07 | 43.07 | 0.65 | 0.01 | 0.12 | 0.6 | 0.53 | 0.1 | 0.09 | 100 |
| gran-BF2 | 0.66 | 9.49 | 8.46 | 34.42 | 1.66 | 1.02 | 41.87 | 0.61 | 0.01 | 0.11 | 0.69 | 0.84 | 0.09 | 0.07 | 100 |
| gran-BF3 | 0.97 | 8.12 | 7.65 | 33.14 | 2.12 | 2.15 | 43.96 | 0.61 | 0.01 | 0.1 | 0.53 | 0.49 | 0.09 | 0.07 | 100 |
*Figure 4A*
XRF elemental analysis calculated as oxides (weight %)
| Spectrum Label | Na2O | MgO | Al2O3 | SiO2 | SO3 | K2O | CaO | TiO2 | V2O5 | Cr2O3 | MnO2 | Fe2O3 | SrO | ZrO2 | Total |
|---|---|---|---|---|---|---|---|---|---|---|---|---|---|---|---|
| gran-BF1 | 0.6 | 10.7 | 10.86 | 44.89 | 2.61 | 0.66 | 28.41 | 0.43 | 0.01 | 0.07 | 0.38 | 0.3 | 0.05 | 0.04 | 100 |
| gran-BF2 | 0.67 | 11.47 | 10.67 | 45.4 | 2.2 | 0.62 | 27.52 | 0.41 | 0.01 | 0.06 | 0.43 | 0.47 | 0.04 | 0.04 | 100 |
| gran-BF3 | 0.98 | 9.86 | 9.8 | 44.67 | 2.89 | 1.34 | 29.29 | 0.41 | 0.01 | 0.06 | 0.33 | 0.28 | 0.04 | 0.04 | 100 |
*Figure 4B*
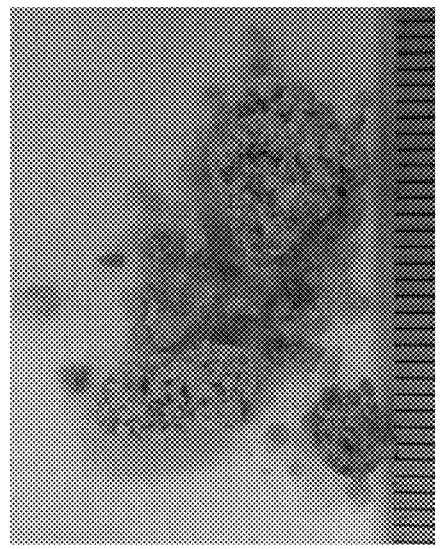
Optical micrograph of granulated slag (scale bar in mm)
*Figure 4D*
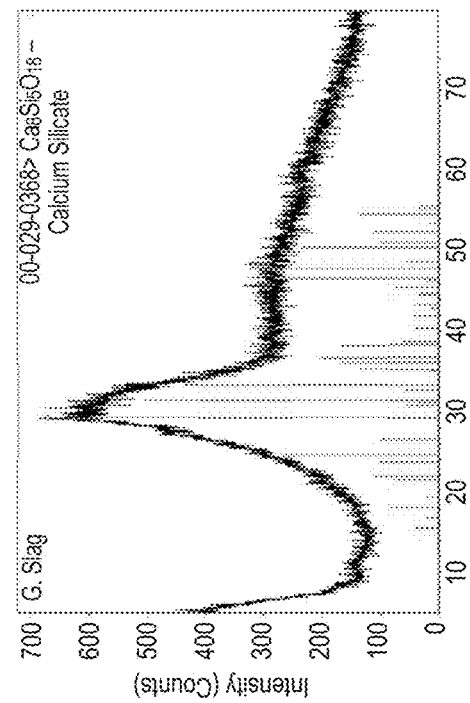
XRD pattern for granulated slag
*Figure 4C*

XRF elemental analysis (weight %)

| Spectrum Label | Na | Mg | Al | Si | S | K | Ca | Ti | V | Cr | Mn | Fe | Sr | Zr | Total |
|---|---|---|---|---|---|---|---|---|---|---|---|---|---|---|---|
| Fly Ash (Low CaO)a | 2.14 | 1.46 | 20.47 | 56.56 | 0.72 | 1.42 | 7.77 | 1.57 | 0 | 0.03 | 0.07 | 7.71 | 0.06 | 0.01 | 100 |
| Fly Ash (Low CaO)b | 1.98 | 1.48 | 20.26 | 56.52 | 0.72 | 1.43 | 7.48 | 1.6 | 0 | 0.03 | 0.06 | 8.34 | 0.08 | 0.01 | 100 |
| Fly Ash (Low CaO)c | 2.15 | 1.63 | 20.02 | 55.54 | 0.84 | 1.24 | 7.58 | 1.61 | 0 | 0.02 | 0.06 | 9.22 | 0.09 | 0.01 | 100 |

*Figure 5A*

XRF elemental analysis calculated as oxides (weight %)

| Spectrum Label | Na2O | MgO | Al2O3 | SiO2 | SO3 | K2O | CaO | TiO2 | V2O5 | Cr2O3 | MnO2 | Fe2O3 | Sr | ZrO2 | Total |
|---|---|---|---|---|---|---|---|---|---|---|---|---|---|---|---|
| Fly Ash (Low CaO)a | 2.08 | 1.64 | 24.26 | 61.72 | 0.72 | 0.67 | 4.15 | 0.94 | 0 | 0.02 | 0.04 | 3.73 | 0.02 | 0 | 100 |
| Fly Ash (Low CaO)b | 1.92 | 1.65 | 23.99 | 61.89 | 0.73 | 0.68 | 4.03 | 0.96 | 0 | 0.02 | 0.03 | 4.06 | 0.03 | 0.01 | 100 |
| Fly Ash (Low CaO)c | 2.07 | 1.81 | 23.65 | 61.23 | 0.86 | 0.6 | 4.15 | 0.99 | 0 | 0.01 | 0.03 | 4.56 | 0.03 | 0.01 | 100 |

*Figure 5B*

| | 80/20 JPL N=8 | 80/20 JPL N=7 | 80/20 JPL N=12 | 95/5 Slag JPL N=8 | 100% AC Slag JPL N=8 | 100% pelletized Slag JPL N=8 | 100% pelletized Slag JPL N=15 | 100% granulated Slag JPL N=8 | Commercial Silica Sand (20/40) N=10 | Commercial ceramic proppant (20/40) N=30 | Commercial Glass beads (1mm) n=30 | Commercial Glass beads (~0.5mm) N=30 | Commercial Andrew's Glass Beads N=30 | Commercial Andrew's resin coated glass beads N=30 |
|---|---|---|---|---|---|---|---|---|---|---|---|---|---|---|
| Composition (wt%) | 80 slag + 20 low Ca flyash | 80 slag + 20 low Ca flyash | 80 slag + 20 low Ca flyash | 95 slag + 5 low Ca flyash | 100 air cooled slag | 100 pelletized slag | 100 pelletized slag | 100 granulated slag | Commercial sand | Commercial ceramic proppant | Commercial Glass beads | Commercial Glass beads | Commercial Andrew's Glass Beads | Commercial Andrew's resin coated glass beads |
| # of beads tested | 8 | 7 | 28 | 12 | 8 | 8 | 15 | 8 | 10 | 30 | 30 | 30 | 30 | 30 |
| Average Strength Mpa (Ksi) | 75 | 132 | 158 | In-progress | 49 | 96 | 132 | 27 | 92 | 112 | 153 | 217 | 338 | 400 |
| S.D. | 48 | 41 | 46 | In-progress | 69 | 71 | 58 | 51 | 41 | 42 | 24 | 27 | 93 | 116 |
| C.V. (%) | 65 | 31 | 26 | In-progress | 44 | 74 | 44 | 187 | 44 | 38 | 16 | 12 | 28 | 29 |
| Weibull Modulus*** | 1.2 | 3.3 | 1.6 | In-progress | 0.9 | 0.9 | 1.7 | 0.8 | 2.8 | 2.9 | 7.4 | 9.3 | 4.1 | 3.7 |
| Characteristic strength Mpa (Ksi)**** | 87 | 148 | 188 | | 41 | 110 | 158 | 22 | 96.4 | 126 | 162 | 229 | 372 | 444 |
| Average diameter (mm) | 1.49 | 1.13 | 0.55 | 1.24 | 1.25 | 1.18 | 0.5 | 1.23 | 0.69 | 0.68 | 1.1 | 0.56 | 0.56 | 0.54 |
| Diameter Range (mm) | 1.46-1.53 | 1.07-1.22 | 0.4-0.6 | 1.20-1.29 | 1.15-1.48 | 1.19-1.17 | 0.48-0.64 | 1.14-1.40 | 0.61-0.82 | 0.63-0.72 | 0.8-1.3 | 0.48-0.66 | 0.46-0.66 | 0.41-0.66 |
| Density (g/cc) | ~2.8 | ~2.74 | ~2.6 | ~2.4 | ~2.7 | ~3 | ~3.1 | ~2.5 | -- | ~2.7* | -- | -- | -- | -- |

*Figure 10*

*Figure 14A* *Figure 14B* *Figure 14C*
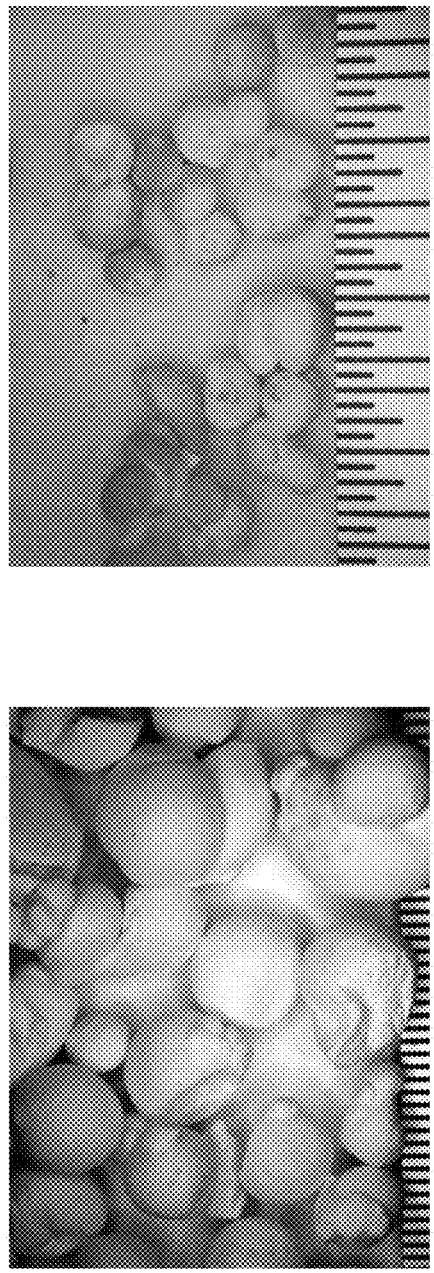
*Figure 15A* *Figure 15B*

ULTRA-LIGHT ULTRA-STRONG PROPPANTS

CROSS-REFERENCES TO RELATED APPLICATIONS

This application claims the benefit of priority to U.S. Provisional Application No. 61/993,187, filed May 14, 2014, incorporated in its entirety herein for all purposes.

STATEMENT AS TO RIGHTS TO INVENTIONS MADE UNDER FEDERALLY SPONSORED RESEARCH OR DEVELOPMENT

The invention described herein was made in the performance of work under a NASA contract, and is subject to the provisions of Public Law 96-517 (35 U.S.C. § 202) in which the Contractor has elected to retain title.

BACKGROUND OF THE INVENTION

Induced hydraulic fracturing is a technique used to release oil and natural gas by creating and maintaining open fractures from a wellbore drilled into reservoir rock formations. A hydraulically pressurized liquid (i.e. a "fracking fluid") comprising water, chemicals, and a particulate proppant material is injected into the wellbore to create cracks in the deep-rock formations through which oil and natural gas can flow more freely. When the hydraulic pressure is removed from the well, the proppant material prevents the induced fractures from closing.

The physical characteristics of the proppant material (e.g., particle size, particle size distribution, specific gravity, surface friction, strength, etc.) have a significant impact on hydraulic fracturing operations and hydrocarbon recovery. Currently available proppants comprised of sand, ceramic, glass, or sintered bauxite are significantly denser than the fracking fluid. This results in non-optimal distributions of the proppant particles within the well. Moreover, existing proppants demonstrate a degraded performance over time due to the production of "fines" (crushed fine particulates). The fines settle after removal of the fracking fluids, and greatly reduce permeability to oil and natural gas.

What is needed are proppant materials, and methods of preparing proppant materials, having a low density close to that of water while maintaining a high strength to withstand closure stresses, thereby resulting in increased oil and natural gas well productivity. Surprisingly, the present invention meets this and other needs.

SUMMARY OF THE INVENTION

In one embodiment, the present invention provides a method of preparing a proppant material, the method including heating a reaction mixture comprising a plurality of oxides. The reaction mixture is heated in a reactive atmosphere to a temperature above the melting point of the reaction mixture to form a melt. The melt is allowed to solidify in a mold, the solidified melt being in the form of spherical particles characterized by a specific gravity of about 1.5 to 3.0 and a crush strength of at least about 10,000 psi.

In another embodiment, the present invention provides a method of preparing a proppant material, the method including heating a reaction mixture comprising a plurality of oxides and one or more additives. The reaction mixture is heated in a reactive atmosphere to a temperature below the melting point of the reaction mixture to form a powder comprising one or more reaction products. The powder is processed to form spherical particles characterized by a specific gravity of about 1.0 to 1.7 and a crush strength of at least about 10,000 psi.

In another embodiment, the present invention provides a proppant material. The proppant material includes spherical particles comprising a material selected from oxides, nitrides, oxynitrides, borides, and carbides. The spherical particles are characterized by a specific gravity of about 1.0 to 3.0 and a crush strength of at least about 10,000 psi.

In another embodiment, the present invention provides a proppant material prepared by a method, the method including heating a reaction mixture comprising a plurality of oxides. The reaction mixture is heated in a reactive atmosphere to a temperature above the melting point of the reaction mixture to form a melt. The melt is allowed to solidify in a mold, the solidified melt being in the form of spherical particles comprising one or more of the plurality of oxides, the spherical particles being characterized by a specific gravity of about 1.5 to 3.0 and a crush strength of at least about 10,000 psi.

In another embodiment, the present invention provides a proppant material prepared by a method, the method including heating a reaction mixture comprising a plurality of oxides and one or more additives. The reaction mixture is heated in a reactive atmosphere to a temperature below the melting point of the reaction mixture to form a powder comprising one or more reaction products. The powder is processed to form spherical particles comprising an oxide, nitride, oxynitride, boride, or carbide, the spherical particles being characterized by a specific gravity of about 1.0 to 1.7 and a crush strength of at least about 10,000 psi.

BRIEF DESCRIPTION OF THE DRAWINGS

FIG. 3A shows XRF elemental analysis, FIG. 3B shows calculated oxide compositions, FIG. 3C shows XRD data, and FIG. 3D shows an optical photograph, for pelletized metallurgical slag samples.

FIG. 4A shows XRF elemental analysis, FIG. 4B shows calculated oxide compositions, FIG. 4C shows XRD data, and FIG. 4D shows an optical photograph, for granulated metallurgical slag samples.

FIG. 5A shows XRF elemental analysis, FIG. 5B shows calculated oxide compositions.

$$P = \left\{ \frac{4.46(2.150 \upsilon_o)^\alpha}{(1-2\upsilon)} \frac{\sigma_0}{\beta} \left( \frac{(1-\upsilon^2)}{E} \right)^{\frac{2-3\alpha}{3}} \frac{1}{r^{3\alpha}} \right\}^{\frac{3}{1+3\alpha}}$$

where P=stress at which proppant fractures, $V_o$=reference volume, $\upsilon$=Poisson's ratio, E=Young's modulus, $\sigma_0$=flexural strength, and r=proppant radius.

Figure 6:
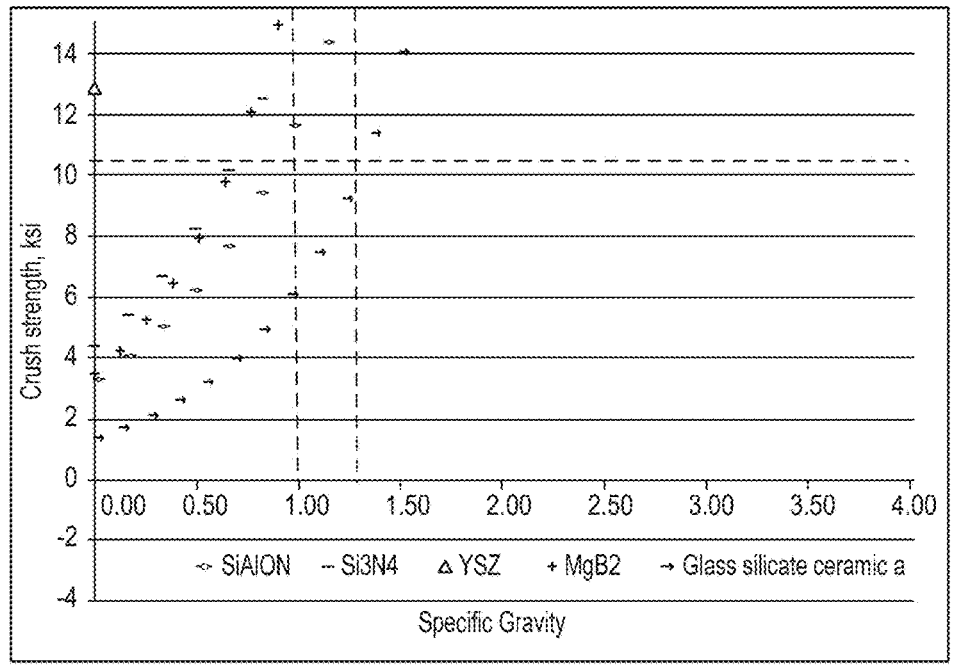
FIG. 6 shows a plot of predicted crush strength as a function of specific gravity for a number of non-limiting examples of proppant materials that can be formed according to embodiments of the invention, including $Si_{6-z}Al_zO_zN_{8-z}$, $Si_3N_4$, YSZ, $MgB_2$, and a glass silicate ceramic. The calculations used to generate the crush strength values in FIG. 6 assume: (i) a 0.74 packing factor with 12 contact points for each particle; (ii) Poisson's ratio being maintained for all porosities; (iii) reference volumes fixed at 160 mm³; and (iv) a proppant radius of 0.292 mm, and the following formula was used.
Figure 7:
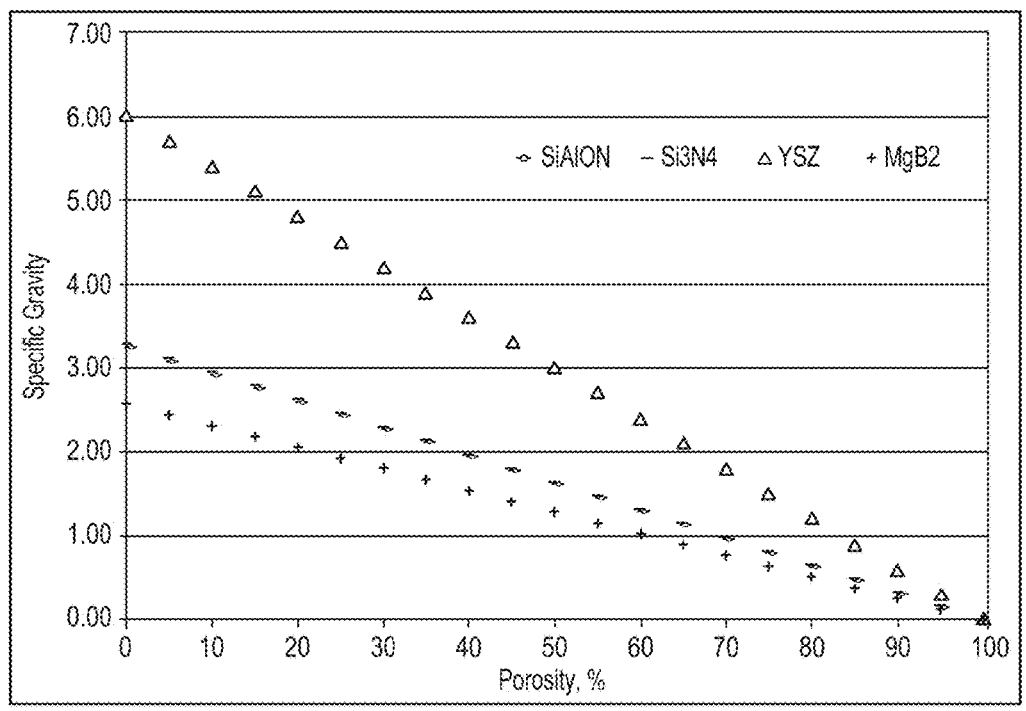

FIG. 7 shows a plot of specific gravity as a function of porosity for the $Si_{6-z}Al_zO_zN_{8-z}$, $Si_3N_4$, YSZ, and $MgB_2$ materials shown in FIG. 6.

Figure 8A:
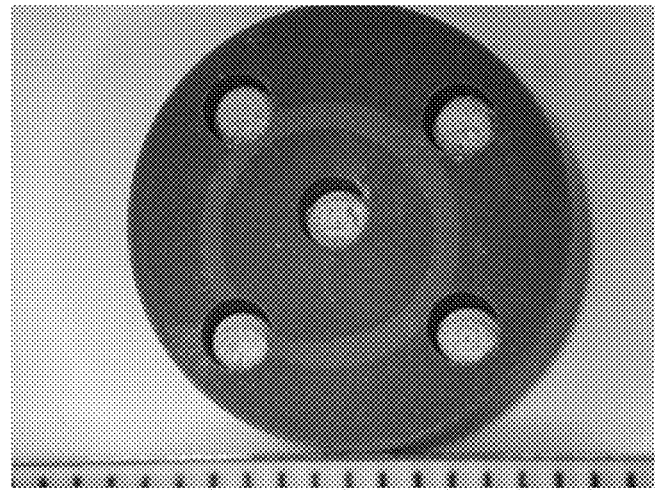
Figure 8B:
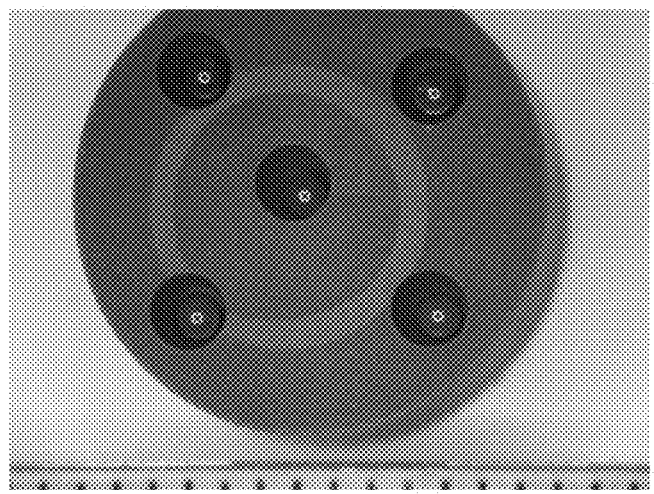

FIGS. 8A-8B show exemplary powder samples before and after melting. FIG. 8A shows a graphite crucible (i.e. a mold) with round bottom holes in which powders are loaded before melting, and FIG. 8B shows spherical particles (i.e. beads) in the graphite crucible holes after melting.

Figure 9A:
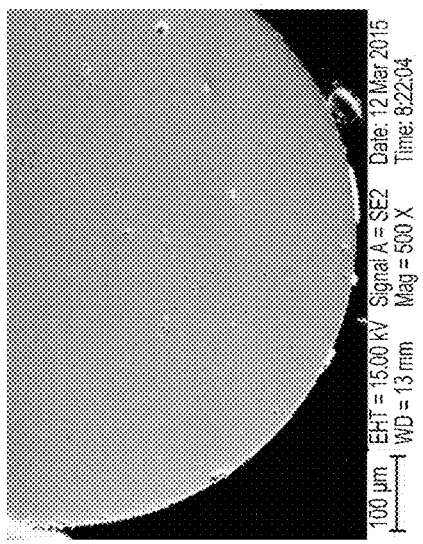
Figure 9B:
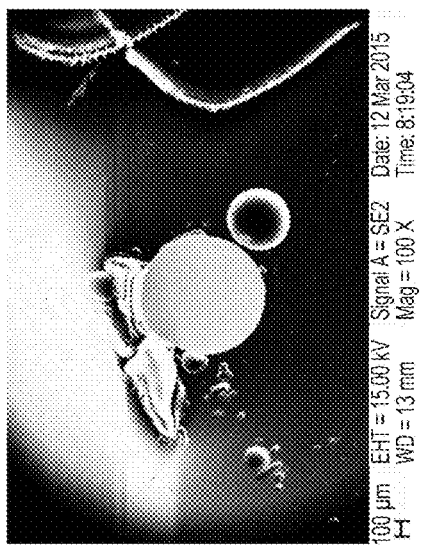
Figure 9C:
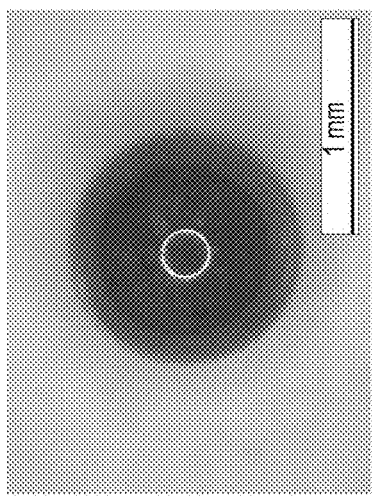
Figure 9D:
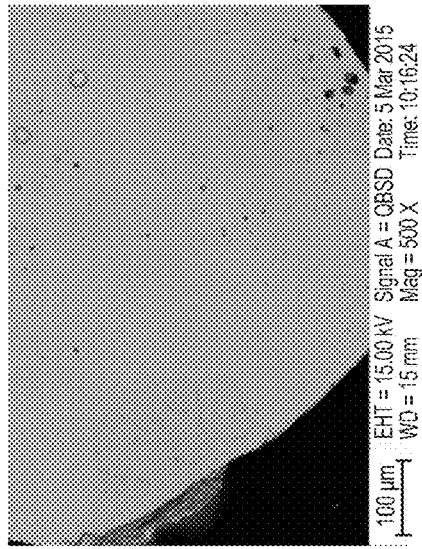
Figure 9E:
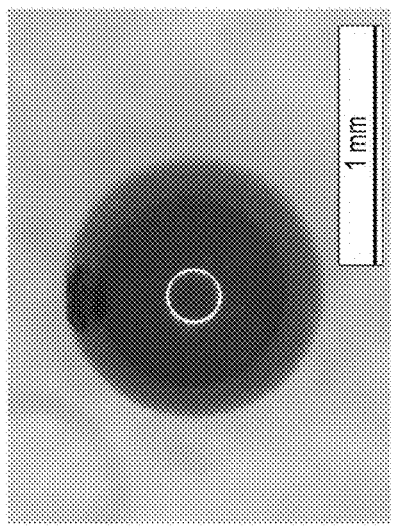
Figure 9F:
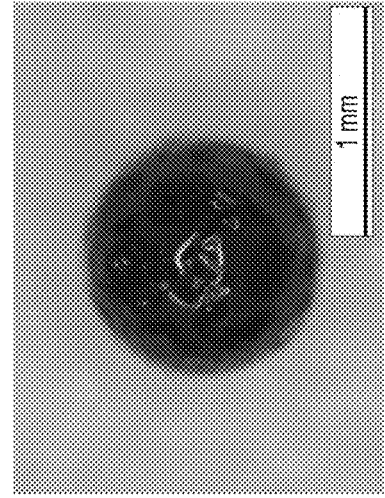

FIGS. 9A-9F show exemplary molten beads. FIG. 9A shows an optical photograph of a single molten bead comprising 80% (w/w) air-cooled slag and 20% (w/w) low-Ca fly ash, FIG. 9B shows an SEM cross-sectional image of the molten bead, and FIG. 9C shows a close-up SEM cross-sectional image of the molten bead. FIGS. 9D-9E show optical photographs of molten beads comprising 100% (w/w) pelletized slag, and FIG. 9F shows a cross-sectional SEM image of a molten bead comprising 100% (w/w) pelletized slag.

FIG. 10 shows a table of spherical bead compositions, diameters, and strength measurements for the tested samples formed from waste stream materials. Commercially available silica, ceramic, and glass proppants were also tested, and the resulting data for these materials is shown in FIG. 10 for purposes of comparison.

Figure 11A:
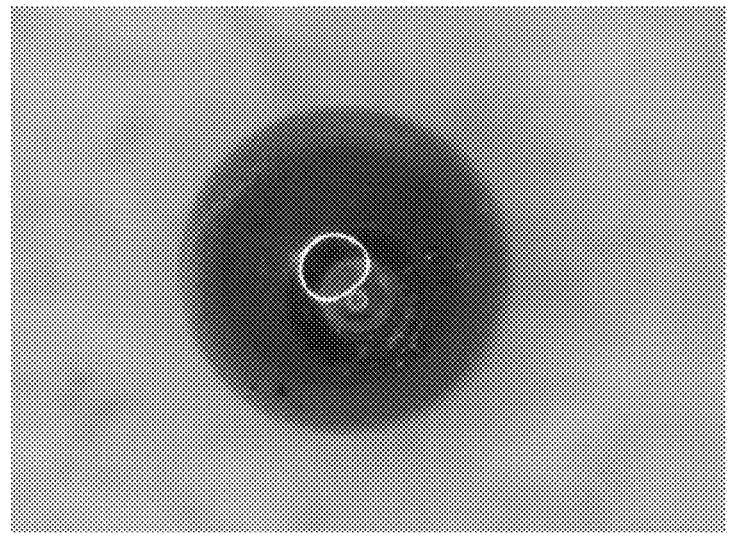
Figure 11B:
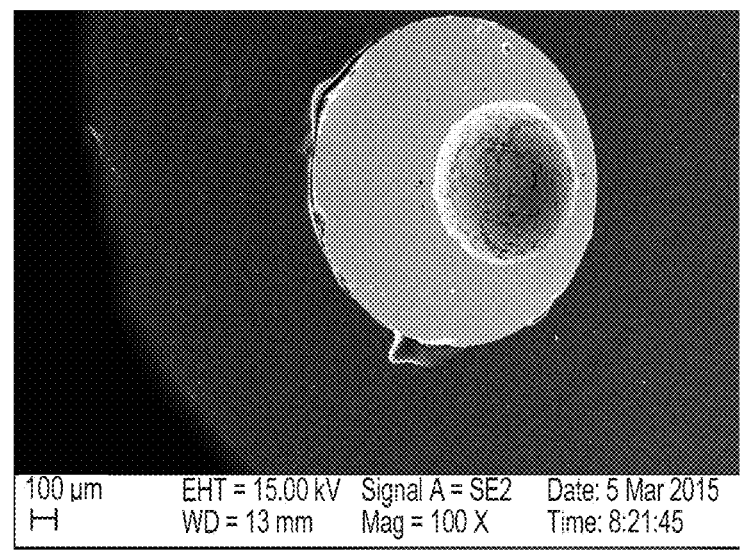

FIG. 11A shows an optical photograph of a hollow spherical bead comprising 95% (w/w) air-cooled slag and 5% (w/w) low-Ca fly ash, and FIG. 11B shows a cross-sectional SEM image of the same hollow spherical bead.

Figure 12:
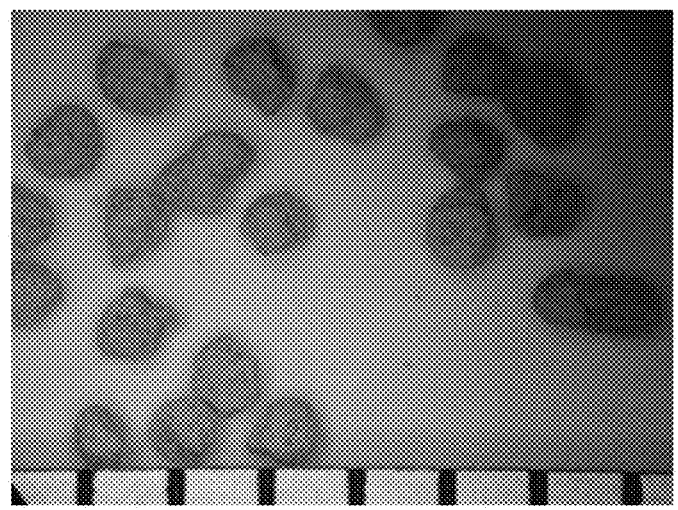

FIG. 12 shows optical photographs of beads comprising $Si_{6-z}Al_zO_zN_{8-z}$ precursors formed by vacuum drying and templating.

Figure 13A:
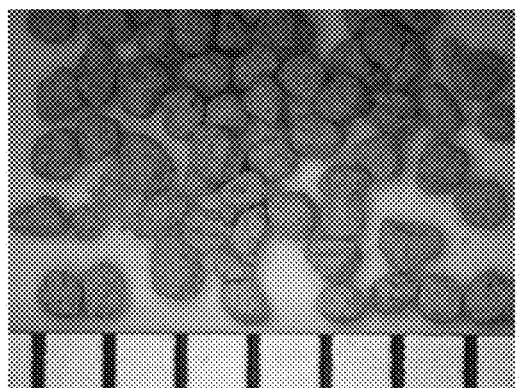
Figure 13B:
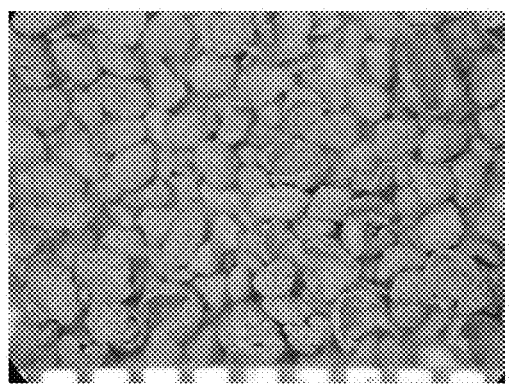

FIGS. 13A-13B show optical photographs of beads comprising $Si_{6-z}Al_zO_zN_{8-z}$ precursors formed by controlled thermal treatments and templating.

FIGS. 14A-14C show optical photographs of beads comprising $Si_{6-z}Al_zO_zN_{8-z}$ formed by annealing and templating.

FIGS. 15A-15B show optical photographs of beads comprising $Si_{6-z}Al_zO_zN_{8-z}$ formed by rapid freezing in liquid nitrogen.

Figure 16A:
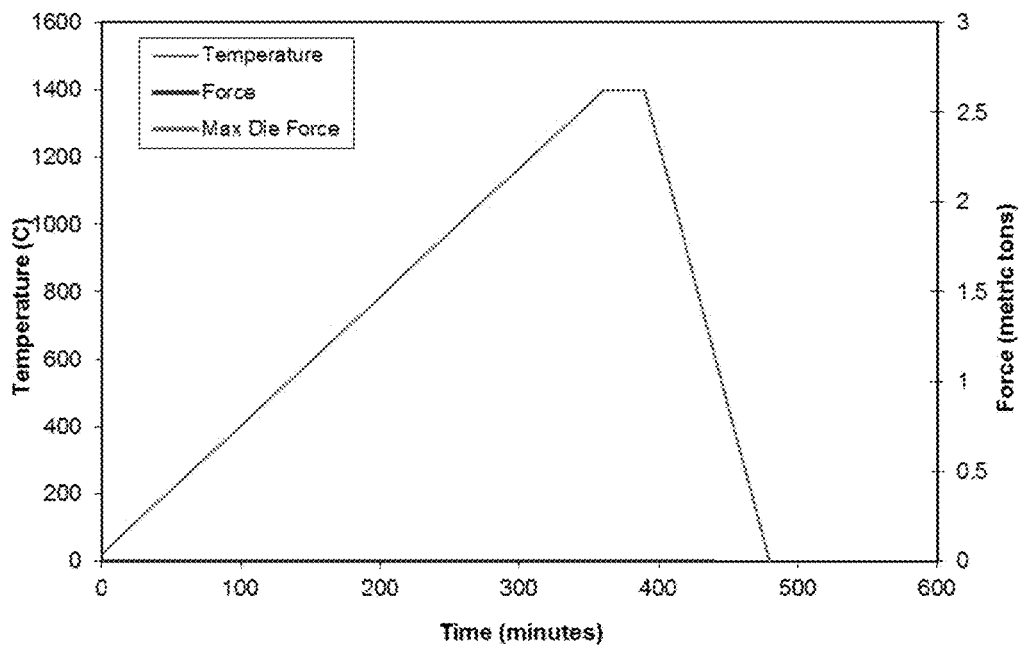
Figure 16B:
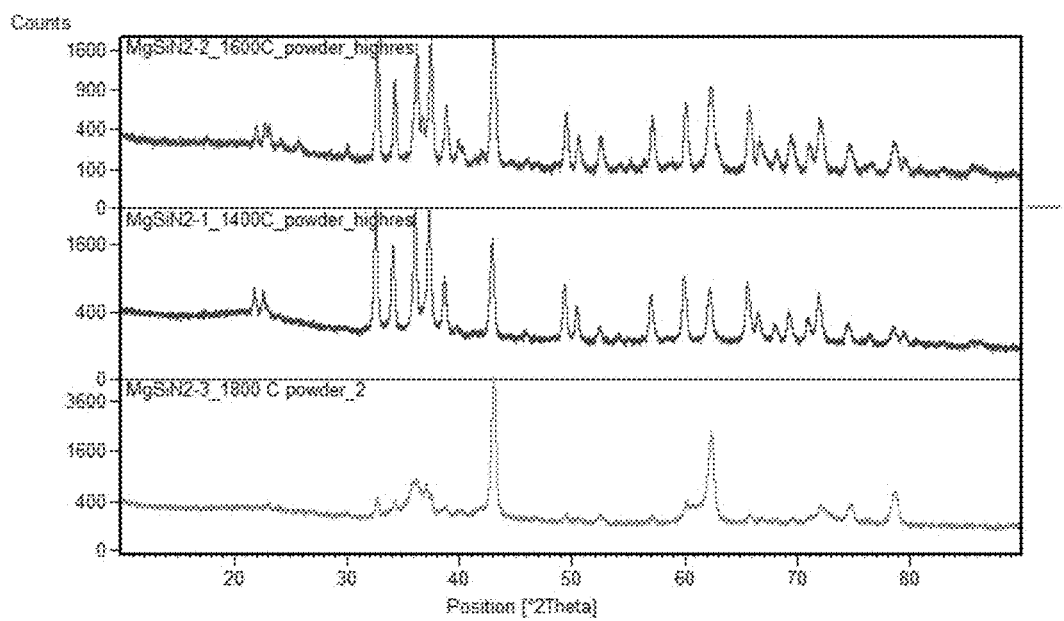

FIG. 16A shows a hot press profile used to form a proppant material comprising $MgSiN_2$ from a mixture of low-Ca fly ash (containing $SiO_2$) and $Mg_3N_2$. FIG. 16B shows XRD data indicating the presence of $MgSiN_2$ in the formed material.

DETAILED DESCRIPTION OF THE INVENTION

I. General

Figure 1A:
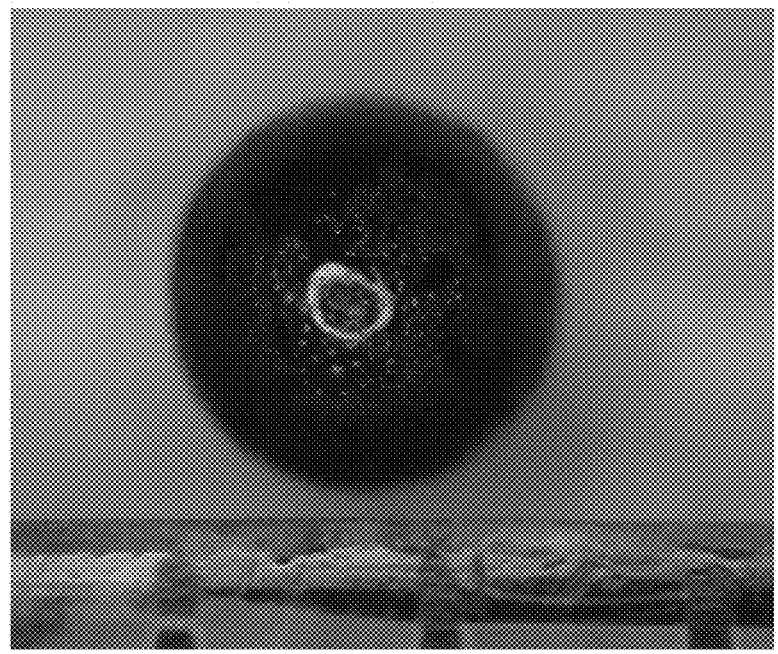
FIG. 1A shows an optical photograph of a spherical particle comprising 80% (w/w) air-cooled slag and 20% (w/w) fly ash with low CaO concentrations ("low-Ca fly ash"). The spherical particle was formed via direct melt processing using RF heating.
Figure 1B:
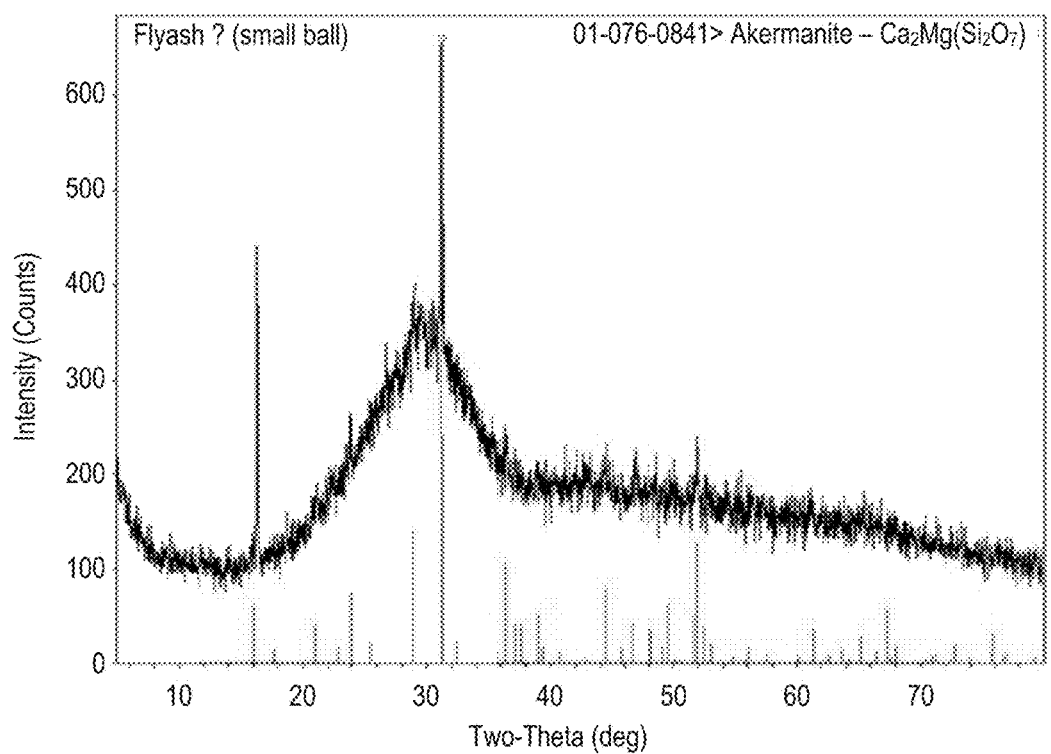
FIG. 1B shows x-ray diffraction (XRD) data for the imaged particle.
Figures 2A, 2B, 2C, 2D:
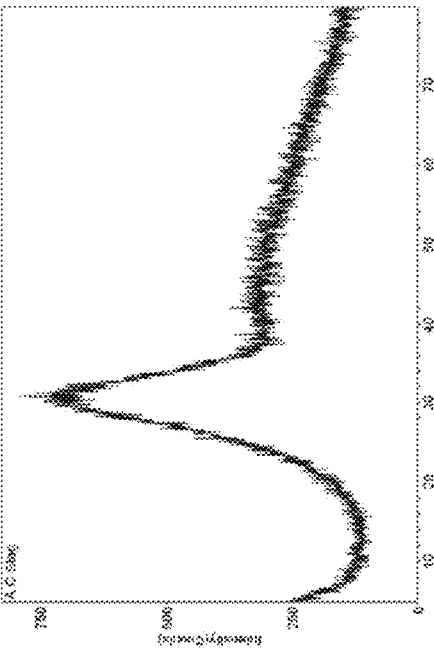
FIG. 2A shows X-ray fluorescence (XRF) elemental analysis.
FIG. 2B shows calculated oxide compositions.
FIG. 2C shows XRD data.
FIG. 2D shows an optical photograph, for air-cooled metallurgical slag samples.
Figure 5D:
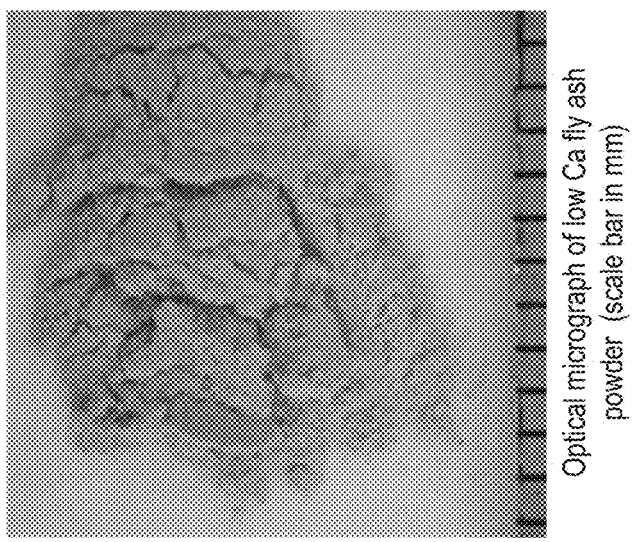
FIG. 5D shows an optical photograph, for low-Ca fly ash samples.
Figure 5C:
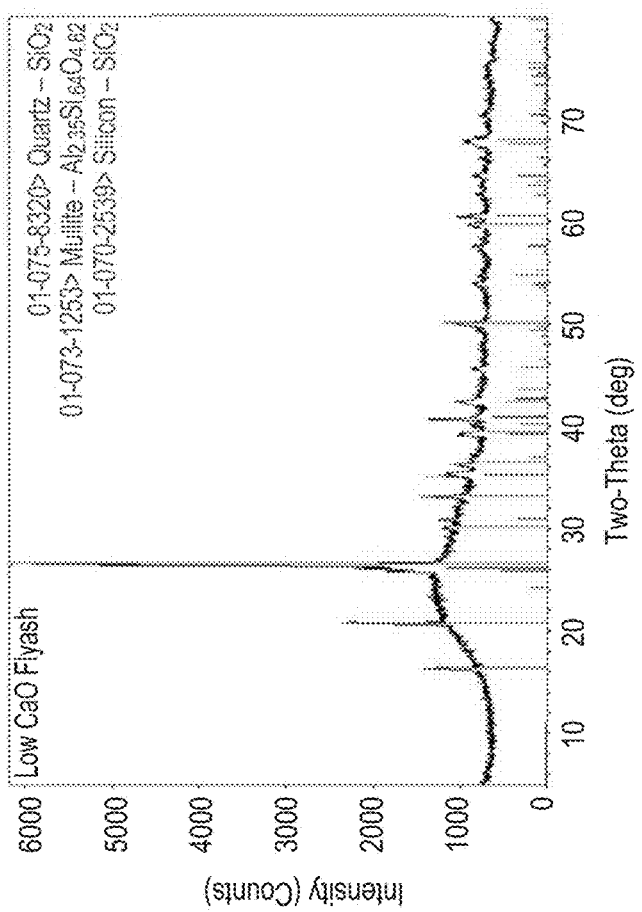
FIG. 5C shows XRD data.

The present invention provides proppant materials, and methods of preparing proppant materials, that are ultra-strong and ultra-light. The proppant materials of the present invention can be in the form of spherical particles (i.e. beads) as shown in FIG. 1A, and can have a density close to that of water, thereby promoting optimal distribution and localization of proppant particles in hydraulic fractures. Despite the low density, the proppant materials retain a very high crush strength which inhibits the formation of fines that adversely impact oil and gas permeability.

Moreover, the proppant materials of the present invention can be prepared using readily available, low cost, and high volume waste stream materials such as metallurgical slag and fly ash. The use of such waste stream sources not only reduces the cost of manufacturing the proppants, it also provides the benefit of recycling the undesirable waste products that presently have utility in only a small number of niche applications.

As shown in FIGS. 2A-5D, waste stream materials such as metallurgical slag and fly ash can contain a number of different oxide materials in different concentrations. The proppant materials of the present invention can be formed by direct melt processing of a reaction mixture comprising oxide-rich waste stream material in a reactive atmosphere such as nitrogen. In such methods, the mixture can be melted and then solidified in the form the spherical proppant material using a mold. This can be a low cost, rapid, and streamlined approach to forming proppant materials having high strength and low density.

In some embodiments, the resulting proppant material phases can be formed by way of reaction product initiation. In such methods, the reaction mixture can include one or more precursor additives, with the combination of additives and oxide-rich waste stream material being heated in a reactive atmosphere to form a bulk powder comprising reaction products such as nitrides, oxynitrides, borides, carbides, and the like. Ratios of selected waste stream sources and additives can be adjusted to produce targeted reaction products. These engineered powder materials can then be processed by melting, hot pressing, sintering, etching, templating, etc. to form spherical proppant particles having a desired composition, specific gravity, crush strength, porosity, and morphology.

II. Definitions

"Proppant material" refers to a material suitable for keeping an induced hydraulic fracture open during or following a fracturing treatment.

"Waste stream material" refers to a material that is a waste produced by industrial activity of factories, mills, power plants, and the like. Waste stream materials useful in the present invention include, but are not limited to, metallurgical slag such as air-cooled slag, pelletized slag, and granulated slag, and fly ash. "Metallurgical slag" refers to a glass-like by-product left over from smelting a desired metal from its raw ore. "Fly ash" refers to fine residual particles generated in the combustion of materials such as coal.

"Oxide" refers to a chemical compound that contains at least one oxygen atom and one other element. Oxides useful in the present invention include, but are not limited to, $SiO_2$, $Al_2O_3$, $Fe_2O_3$, FeO, $Fe_3O_4$, CaO, MgO, $MnO_2$, MnO, $Na_2O$, $SO_3$, $K_2O$, $TiO_2$, $V_2O_5$, $Cr_2O_3$, SrO, $ZrO_2$, $3Al_2O_3 2SiO_2$, $2Al_2O_3 SiO_2$, $Ca_2Mg(Si_2O_7)$, $Ca_2SiO_4$, yttria-stabilized zirconia (YSZ), and $CaCO_3$. Some or all of these oxides can be present in various ratios in metallurgical slag and fly ash.

"Nitride" refers to a chemical compound that contains at least one nitrogen atom and one other element. Nitrides useful in the present invention include, but are not limited to, $Li_2SiN_2$, $CaSiN_2$, $MgSiN_2$, and $Si_3N_4$.

"Oxynitride" refers to a chemical compound that contains at least one oxygen atom, one nitrogen atom, and one other element. Oxynitrides useful in the present invention include, but are not limited to, $Si_{6-z}Al_zO_zN_{8-z}$ where $0<z<5$.

"Boride" refers to a chemical compound that contains at least one boron atom and one other less electronegative element. Borides useful in the present invention include, but are not limited to, $MgB_2$.

"Carbide" refers to a chemical compound that contains at least one carbon atom and one other less electronegative element. Carbides useful in the present invention include, but are not limited to, SiC.

"Additive" refers to a substance that is added. Additives useful in the present invention include, but are not limited to, C, Al, Si, Mg, K, Fe, Na, B, O, N, $ZrO_2$, $Y_2O_3$, and compounds thereof, volcanic ash, and aluminum dross.

"Volcanic ash" refers to particles of pulverized rock, minerals, and volcanic glass created during volcanic eruptions.

"Aluminum dross" refers to a by-product of the aluminum smelting process, and typically contains $Al_2O_3$, residual Al metal, and other species.

"Reactive atmosphere" refers to a gas including one or more reactive elements, molecules, or ions. Reactive atmospheres useful in the present invention include, but are not limited to, $N_2$, $O_2$, air, $CO_2$, and combinations thereof.

"Etchant" refers to a corrosive substance used to dissolve a solid material. Etchants useful in the present invention include, but are not limited to, hydrochloric acid, hydrofluoric acid, sodium hydroxide, phosphoric acid, nitric acid, and ammonium fluoride.

"Slurry" refers to a semiliquid mixture containing at least a particulate solid material and water (or other liquid).

"Templating particle" refers to a particulate material on which another material can be coated such that, when the templating particle is removed (e.g., via a calcining process), the other material retains the shape of the templating particle. Templating particle materials useful in the present invention include, but are not limited to, glass, polystyrene, and cellulose. One example of a cellulose material is walnut shell.

"Crush strength" refers to a proppant pack level crush resistance measured by a testing procedure in accordance with ISO 135032. In this test, a specified volume of proppant material is crushed in a test cell and the amount of fines produced are quantified for a given applied stress. Crush strength is then defined as the stress level at which an acceptable amount of fines are produces (typically less than 5 to 10% fines).

"Specific gravity" refers to the ratio of the density of a substance to the density of water having the same volume as the substance.

"Porosity" refers to the measure of void space in a material, and is represented as a percentage of the volume of voids in the total volume of the material. A material with 0% porosity has no voids and a material with a porosity of 60%, for example, has one or more void spaces comprising 60% of the total volume of the material.

"Sphericity" refers to how close a proppant particle approaches the shape of a sphere. Sphericity is calculated as the ratio of the surface area of a sphere (with the same volume as the given particle) to the surface area of the particle.

"Reaction product" refers to a species formed from a chemical reaction.

"Mold" refers to a hollowed-out refractory material in which another molten material can solidify. Mold materials useful in the present invention include, but are not limited to, graphite and molybdenum.

III. Methods of Preparing Proppant Material from Direct Melt Processing

The present invention provides a method of preparing a proppant material. In some embodiments, the method includes heating a reaction mixture comprising a plurality of oxides. The reaction mixture can be heated in a reactive atmosphere to a temperature above the melting point of the reaction mixture to form a melt. The melt can be allowed to solidify in a mold. The solidified melt can be in the form of spherical particles characterized by a specific gravity of about 1.5 to 3.0 and a crush strength of at least about 10,000 psi.

The plurality of oxides included in the reaction mixture can be any oxides that form proppant materials having the desired specific gravity and crush strength upon solidification. Suitable oxides include, but are not limited to, $SiO_2$, $Al_2O_3$, $Fe_2O_3$, FeO, $Fe_3O_4$, CaO, MgO, $MnO_2$, MnO, $Na_2O$, $SO_3$, $K_2O$, $TiO_2$, $V_2O_5$, $Cr_2O_3$, SrO, $ZrO_2$, $3Al_2O_3 2SiO_2$, $2Al_2O_3 SiO_2$, $Ca_2Mg(Si_2O_7)$, $Ca_2SiO_4$, and $CaCO_3$. In some embodiments, each of the plurality of oxides can be $SiO_2$, $Al_2O_3$, $Fe_2O_3$, FeO, $Fe_3O_4$, CaO, MgO, $MnO_2$, or MnO.

In some embodiments, the reaction mixture can further include one or more additives. Any additives suitable for forming proppant particles of the desired composition can be used. Suitable additives include, but are not limited to, C, Al, Si, Mg, K, Fe, Na, B, O, N, $ZrO_2$, $Y_2O_3$, and compounds thereof, volcanic ash, and aluminum dross.

The reactive atmosphere in which the reaction mixture is heated can include any reactive gas suitable for forming proppant particles of the desired composition and morphology. Suitable reactive atmospheres include, but are not limited to, $N_2$, $O_2$, air, $CO_2$, and combinations thereof. In some embodiments, the reactive atmosphere can be $N_2$.

The reaction mixture can be heated to any temperature above the melting point of the reaction mixture to form the melt. In some embodiments, the reaction mixture can be heated to a temperature of about 800 to 2,500° C. In other embodiments, the reaction mixture can be heated to a temperature of about 850 to 2,450° C., 900 to 2,400° C., 950 to 2,350° C., 1,000 to 2,300° C., 1,050 to 2,250° C., 1,100 to 2,200° C., 1,150 to 2,150° C., 1,200 to 2,100° C., 1,250 to 2,050° C., 1,300 to 2,000° C., 1,350 to 1,950° C., 1,400 to 1,900° C., 1,450 to 1,850° C., 1,500 to 1,800° C., 1,550 to 1,750° C., or about 1,600 to 1,700° C. In other embodiments, the reaction mixture can be heated to a temperature of about 1,200 to 2,000° C.

The mold can comprise any suitable material on which spherical particles form upon solidification. In some embodiments, the mold can comprise graphite or molybdenum. In other embodiments, the mold can comprise graphite. In yet other embodiments, the mold can comprise a refractory material (e.g., alumina) coated with graphite or molybdenum. The mold can have any suitable dimensions. In some embodiments, the mold can comprise cylindrical holes in which the melt solidifies to form the spherical particles. In some embodiments, the melt can be introduced into the mold and then allowed to solidify. For example, the melt can be prepared in a separate crucible and then dripped into cylindrical holes of the mold where the melt cools and solidifies to form the spherical particles. In other embodiments, the reaction mixture comprising the plurality of oxides can be introduced into the mold in solid form and then heated. For example, a powder comprising the reaction mixture can be loaded into cylindrical holes of the mold where the powder is then heated to form a melt, cooled, and solidified to form the spherical particles.

In some embodiments, the plurality of oxides included in the reaction mixture are present in the form of waste stream material. Any waste stream material suitable for forming spherical particles of the desired composition and morphology can be used. Suitable waste stream materials include, but are not limited to, metallurgical slag such as air-cooled slag, pelletized slag, and granulated slag, and fly ash. In some embodiments, the waste stream material can be air-cooled slag. In other embodiments, the waste stream material can be pelletized slag. In still other embodiments, the waste stream material can be granulated slag. In yet other embodiments, the waste stream material can be fly ash. In some embodiments, the waste stream material can be aluminum dross. In some embodiments, the proppants of the present invention are formed using only waste stream material such as metallurgical slag and/or fly ash.

In some embodiments, the waste stream material comprises metallurgical slag and fly ash. Any ratio of metallurgical slag and fly ash suitable for forming spherical particles having the desired composition and morphology can be used. In some embodiments, the metallurgical slag and fly ash can comprise about 50-99% (w/w) and 1-50% (w/w), respectively, of the reaction mixture. In other embodiments, the metallurgical slag and fly ash can comprise about 1-50% (w/w) and 50-99% (w/w), respectively, of the reaction mixture. In yet other embodiments, the metallurgical slag and fly ash can comprise about 20-99% (w/w) and 1-80% (w/w), respectively, of the reaction mixture. In still other embodiments, the metallurgical slag and fly ash can comprise about 1-80% (w/w) and 20-99% (w/w), respectively, of the reaction mixture. In some embodiments, the metallurgical slag can comprise about 50-95% (w/w), 50-90% (w/w), 50-85% (w/w), 50-80% (w/w), 50-75% (w/w), 50-70% (w/w), 50-65% (w/w), or about 50-60% (w/w) of the reaction mixture. In other embodiments, the metallurgical slag can comprise about 5-50% (w/w), 10-50% (w/w), 15-50% (w/w), 20-50% (w/w), 25-50% (w/w), 30-50% (w/w), 35-50% (w/w), or about 40-50% (w/w) of the reaction mixture. In some embodiments, the fly ash can comprise about 5-50% (w/w), 10-50% (w/w), 15-50% (w/w), 20-50% (w/w), 50% (w/w), 30-50% (w/w), 35-50% (w/w), or about 40-50% (w/w) of the reaction mixture. In other embodiments, the fly ash can comprise about 50-95% (w/w), 50-90% (w/w), 50-85% (w/w), 50-80% (w/w), 50-75% (w/w), 50-70% (w/w), 50-65% (w/w), or about 50-60% (w/w) of the reaction mixture. In still other embodiments, the metallurgical slag and fly ash can comprise about 95% (w/w) and 5% (w/w), respectively, of the reaction mixture. In yet other embodiments, the metallurgical slag and fly ash can comprise about 80% (w/w) and 20% (w/w), respectively, of the reaction mixture.

The spherical particles formed upon solidification can have any suitable composition. In some embodiments, the spherical particles can comprise one or more oxides. For example, in some embodiments, the one or more oxides can be from the plurality of oxides included in the reaction mixture. In other embodiments, the one or more oxides can instead be formed as a result of heating the reaction mixture in the reactive atmosphere. Suitable oxides include, but are not limited to, $SiO_2$, $Al_2O_3$, $Fe_2O_3$, CaO, MgO, FeO, $Fe_3O_4$, MnO, yttria-stabilized zirconia (YSZ), and $CaCO_3$. In some embodiments, the spherical particles can be characterized by magnetic properties.

In some embodiments, the method can further include coating the spherical particles with a material that can be an organic, nitride, or ceramic material. The coating may promote containment of fines formed as the result of fracture stresses crushing the spherical particles in operation. Suitable organics include, but are not limited to, phenolic polymers and polyurethane.

The spherical particles can have any specific gravity suitable for induced hydraulic fracturing applications. Suitable specific gravities can be close to that of water, i.e. "1". In some embodiments, the spherical particles can be characterized by a specific gravity of about 1.5 to 2.9, 1.6 to 2.8, 1.7 to 2.7, 1.8 to 2.6, 1.9 to 2.5, 2.0 to 2.4, or about 2.1 to 2.3. In other embodiments, the spherical particles can be characterized by a specific gravity of about 2.0 to 3.0.

The spherical particles can have any crush strength suitable for induced hydraulic fracturing applications. In some embodiments, the spherical particles can have a crush strength of at least about 10,250 psi, 10,500 psi, 10,750 psi, 11,000 psi, 11,250 psi, 11,500 psi, 11,750 psi, 12,000 psi, 12,250 psi, 12,500 psi, 12,750 psi, 13,000 psi, 13,250 psi, 13,500 psi, 13,750 psi, or at least about 14,000 psi.

The spherical particles can have any porosity suitable to attain the desired crush strength and specific gravity. In some embodiments, the spherical particles are characterized by a porosity of about 10 to 60%. In other embodiments, the spherical particles can be characterized by a porosity of about 13 to 57%, 16 to 54%, 19 to 51%, 22 to 48%, 25 to 45%, 28 to 42%, 31 to 39%, or about 34 to 36%. In some embodiments, the spherical particles can comprise a hollow core.

The spherical particles can have any size suitable to attain the desired crush strength, specific gravity, and fracture particle distribution. In some embodiments, the spherical particles are characterized by a diameter of about 0.1 to 1.7 mm. In other embodiments, the spherical particles are characterized by a diameter of about 0.1 to 1.6 mm, 0.2 to 1.6 mm, 0.3 to 1.6 mm, 0.4 to 1.6 mm, 0.5 to 1.5 mm, 0.6 to 1.4 mm, 0.7 to 1.3 mm, 0.8 to 1.2 mm, or about 0.9 to 1.1 mm. In other embodiments, the spherical particles are characterized by a diameter of about 0.3 to 0.7 mm. In some embodiments, at least about 80% of the spherical particles are characterized by a diameter within 20% of the average diameter of the spherical particles. In some embodiments, the spherical particles are characterized by a sphericity of about 0.7 to 1.0. In other embodiments, the spherical particles are characterized by a sphericity of about 0.8 to 1.0. In yet other embodiments, the spherical particles are characterized by a sphericity of about 0.9 and 1.0.

In some embodiments, the method can include heating a reaction mixture comprising a plurality of oxides and one or more additives, wherein the reaction mixture can be heated in a reactive atmosphere to a temperature above the melting point of the reaction mixture to form a melt. Each of the plurality of oxides can be $SiO_2$, $Al_2O_3$, $Fe_2O_3$, FeO, $Fe_3O_4$, CaO, MgO, $MnO_2$, MnO, $Na_2O$, $SO_3$, $K_2O$, $TiO_2$, $V_2O_5$, $Cr_2O_3$, SrO, $ZrO_2$, $3Al_2O_3 2SiO_2$, $2Al_2O_3 SiO_2$, $Ca_2Mg(Si_2O_7)$, $Ca_2SiO_4$, or $CaCO_3$. The one or more additives can be C, Al, Si, Mg, K, Fe, Na, B, O, N, $ZrO_2$, $Y_2O_3$, compounds thereof, volcanic ash, or aluminum dross, and the reactive atmosphere can comprise $N_2$, $O_2$, air, $CO_2$, or combinations thereof. The reaction mixture can be heated to a temperature of about 800 to 2,500° C., and the plurality of oxides can be present in the form of waste stream material, wherein the waste stream material can comprise metallurgical slag and fly ash, and wherein the metallurgical slag and fly ash can comprise about 20-99% (w/w) and 1-80% (w/w), respectively, of the reaction mixture. The melt can be allowed to solidify in a mold comprising graphite, and the solidified melt can be in the form of spherical particles characterized by a specific gravity of about 1.5 to 3.0, a crush strength of at least about 10,000 psi, a sphericity of about 0.7 to 1.0, a porosity of about 10 to 60%, and a diameter of about 0.1 to 1.7 mm. The spherical particles can be coated with a coating material that can be an organic, ceramic, or nitride material.

IV. Methods of Preparing Proppant Material from Reaction Product Initiation

The present invention provides a method of preparing a proppant material. In some embodiments, the method can include heating a reaction mixture comprising a plurality of oxides and one or more additives. The reaction mixture can be heated in a reactive atmosphere to a temperature below the melting point of the reaction mixture to form a powder comprising one or more reaction products. The powder can be processed to form spherical particles characterized by a specific gravity of about 1.0 to 1.7 and a crush strength of at least about 10,000 psi.

The plurality of oxides included in the reaction mixture can be any oxides that react to form the desired reaction products. Suitable oxides include, but are not limited to, $SiO_2$, $Al_2O_3$, $Fe_2O_3$, FeO, $Fe_3O_4$, CaO, MgO, $MnO_2$, MnO. $Na_2O$, $SO_3$, $K_2O$, $TiO_2$, $V_2O_5$, $Cr_2O_3$, SrO, $ZrO_2$, $3Al_2O_3 2SiO_2$, $2Al_2O_3 SiO_2$, $Ca_2Mg(Si_2O_7)$, $Ca_2SiO_4$, and $CaCO_3$. In some embodiments, each of the plurality of oxides can be $SiO_2$, $Al_2O_3$, $Fe_2O_3$, FeO, $Fe_3O_4$, CaO, MgO, $MnO_2$, or MnO.

The reaction mixture can include any additives suitable for forming proppant particles of the desired composition. Suitable additives include, but are not limited to, C, Al, Si, Mg, K, Fe, Na, B, O, N, $ZrO_2$, $Y_2O_3$, and compounds thereof, volcanic ash, and aluminum dross.

The reactive atmosphere in which the reaction mixture is heated can include any reactive gas suitable for forming proppant particles of the desired composition. Suitable reactive atmospheres include, but are not limited to, $N_2$, $O_2$, air, $CO_2$, and combinations thereof. In some embodiments, the reactive atmosphere can be $N_2$.

The one or more reaction products included in the powder formed by heating the reaction mixture in the reactive atmosphere can have any suitable composition. In some embodiments, the one or more reaction products can be an oxide, a nitride, an oxynitride, a boride, or a carbide. In other embodiments, the one or more reaction products can be $Si_{6-z}Al_zO_zN_{8-z}$ where 0<z<5, $Li_2SiN_2$, $CaSiN_2$, $MgSiN_2$, $MgB_2$, $Si_3N_4$, or yttria-stabilized zirconia (YSZ). In some embodiments, the spherical particles can be characterized by magnetic properties.

The reaction mixture can be heated to any temperature below the melting point of the reaction mixture suitable for forming the desired one or more reaction products. In some embodiments, the reaction mixture is heated to a temperature of about 700 to 1,800° C. In other embodiments, the reaction mixture can be heated to a temperature of about 800 to 1,700° C., 900 to 1,600° C., 1,000 to 1,500° C., 1,100 to 1,400° C., or about 1,200 to 1,300° C.

In some embodiments, the plurality of oxides included in the reaction mixture are present in the form of waste stream material. Any waste stream material suitable for forming spherical particles of the desired composition can be used. Suitable waste stream materials include, but are not limited to, metallurgical slag such as air-cooled slag, pelletized slag, and granulated slag, and fly ash. In some embodiments, the waste stream material can be air-cooled slag. In other embodiments, the waste stream material can be pelletized slag. In still other embodiments, the waste stream material can be granulated slag. In yet other embodiments, the waste stream material can be fly ash. In still other embodiments, the waste stream material can be aluminum dross.

In some embodiments, the waste stream material comprises metallurgical slag and fly ash. Any ratio of metallurgical slag and fly ash suitable for forming spherical particles having the desired composition and morphology can be used. In some embodiments, the metallurgical slag and fly ash can comprise about 50-99% (w/w) and 1-50% (w/w), respectively, of the reaction mixture. In other embodiments, the metallurgical slag and fly ash can comprise about 1-50% (w/w) and 50-99% (w/w), respectively, of the reaction mixture. In yet other embodiments, the metallurgical slag and fly ash can comprise about 20-99% (w/w) and 1-80% (w/w), respectively, of the reaction mixture. In still other embodiments, the metallurgical slag and fly ash can comprise about 1-80% (w/w) and 20-99% (w/w), respectively, of the reaction mixture. In some embodiments, the metallurgical slag can comprise about 50-95% (w/w), 50-90% (w/w), 50-85% (w/w), 50-80% (w/w), 50-75% (w/w), 50-70% (w/w), 50-65% (w/w), or about 50-60% (w/w) of the reaction mixture. In other embodiments, the metallurgical slag can comprise about 5-50% (w/w), 10-50% (w/w), 15-50% (w/w), 20-50% (w/w), 25-50% (w/w), 30-50% (w/w), 35-50% (w/w), or about 40-50% (w/w) of the reaction mixture. In some embodiments, the fly ash can comprise about 5-50% (w/w), 10-50% (w/w), 15-50% (w/w), 20-50% (w/w), 50% (w/w), 30-50% (w/w), 35-50% (w/w), or about 40-50% (w/w) of the reaction mixture. In other embodiments, the fly ash can comprise about 50-95% (w/w), 50-90% (w/w), 50-85% (w/w), 50-80% (w/w), 50-75% (w/w), 50-70% (w/w), 50-65% (w/w), or about 50-60% (w/w) of the reaction mixture. In still other embodiments, the metallurgical slag and fly ash can comprise about 95% (w/w) and 5% (w/w), respectively, of the reaction mixture. In yet other embodiments, the metallurgical slag and fly ash can comprise about 80% (w/w) and 20% (w/w), respectively, of the reaction mixture.

In some embodiments, the one or more reaction products can comprise an oxide, and processing the powder can include contacting the one or more reaction products with an etchant to remove the oxide. For example, in some embodiments, the reaction mixture can include $SiO_2$ and a nitride additive such as $Li_3N$, $Ca_3N_2$, or $Mg_3N_2$. When heated in an $N_2$ reactive atmosphere, reaction products including silicon nitrides (e.g., $Li_xSi_yN_z$, $CaSiN_2$, or $MgSiN_2$) and oxides (e.g., $Li_2O$, CaO, or MgO) can be formed. If the silicon nitride is the desired material, the oxide reaction product can be removed using an etchant. In some embodiments, etchants can be used to remove non-oxide reaction products, in addition to any remaining oxides and other materials that were present in the reaction mixture prior to heating. Any etchant suitable for removing undesired material in the formed powder while preserving the desired material can be used in embodiments of the invention. Suitable etchants include, but are not limited to, hydrochloric acid, hydrofluoric acid, sodium hydroxide, phosphoric acid, nitric acid, and ammonium fluoride.

In some embodiments, processing the powder can include heating the powder in a non-reactive atmosphere to a temperature above the melting point of the powder to form a melt, and allowing the melt to solidify in a mold, the solidified melt being in the form of the spherical particles.

The mold can comprise any suitable material on which spherical particles form upon solidification. In some embodiments, the mold can comprise graphite or molybdenum. In other embodiments, the mold can comprise graphite. In yet other embodiments, the mold can comprise a refractory material (e.g., alumina) coated with graphite or molybdenum. The mold can have any suitable dimensions. In some embodiments, the mold can comprise cylindrical holes in which the melt solidifies to form the spherical particles. In some embodiments, the melt can be introduced into the mold and then allowed to solidify. For example, the melt can be prepared in a separate crucible and then dripped into cylindrical holes of the mold where the melt cools and solidifies to form the spherical particles. In other embodiments, the formed powder comprising the one or more reaction products can be introduced into the mold in solid form and then heated. For example, the powder can be loaded into cylindrical holes of the mold where the powder is then heated to form a melt, cooled, and solidified to form the spherical particles.

In some embodiments, processing the powder can include forming a slurry comprising the powder, coating templating particles with the slurry, and heating the coated templating particles to consume the templating particles and form the spherical particles. Any suitable templating particle material and heating temperature can be used. In some embodiments, the templating particles can comprise a material that is glass, polystyrene, or cellulose, and the coated templating particles can be heated to a temperature of about 60 to 500° C. to form the spherical particles comprising a hollow core. In some embodiments, the templating particles can comprise glass. In some embodiments, the templating particles can comprise polystyrene. In some embodiments, the templating particles can comprise cellulose. In some embodiments, the cellulose can be present in the form of walnut shell material. For example, the templating particles can comprise walnut shell. In some embodiments, the coated templating particles can be heated to a temperature of about 100 to 450° C., 150 to 400° C., 200 to 350° C., or about 250 to 300° C. to form the spherical particles comprising the hollow core. In other embodiments, the coated templating particles can be heated to a temperature of about 60° C. to form the spherical particles comprising the hollow core. In still other embodiments, the coated templating particles can be heated to a temperature of about 300° C. to form the spherical particles comprising a hollow core. In yet other embodiments, the coated templating particles can be heated to a temperature of about 500° C. to form the spherical particles comprising the hollow core. In some embodiments, the spherical particles comprising the hollow core can be sintered at a temperature of about 500 to 2,000° C. in a reactive atmosphere comprising $N_2$, $O_2$, air, $CO_2$, or combinations thereof. In some embodiments, the spherical particles comprising the hollow core can be sintered at a temperature of about 600 to 1,900° C., 700 to 1,800° C., 800 to 1,700° C., 900 to 1,600° C., 1,000 to 1,500° C., 1,100 to 1,400° C., or about 1,200 to 1,300° C.

In some embodiments, the method can further include coating the spherical particles with a material that can be an organic, nitride, or ceramic material. The coating may promote containment of fines formed as the result of fracture stresses crushing the spherical particles in operation. Suitable organics include, but are not limited to, phenolic polymers and polyurethane.

The spherical particles can have any specific gravity suitable for induced hydraulic fracturing applications. Suitable specific gravities can be close to that of water, i.e. "1". In some embodiments, the spherical particles can be characterized by a specific gravity of about 1.1 to 1.6, 1.2 to 1.5, or about 1.3 to 1.4. In other embodiments, the spherical particles can be characterized by a specific gravity of about 1.0 to 1.3.

The spherical particles can have any crush strength suitable for induced hydraulic fracturing applications. In some embodiments, the spherical particles can have a crush strength of at least about 10,250 psi, 10,500 psi, 10,750 psi, 11,000 psi, 11,250 psi, 11,500 psi, 11,750 psi, 12,000 psi, 12,250 psi, 12,500 psi, 12,750 psi, 13,000 psi, 13,250 psi, 13,500 psi, 13,750 psi, or at least about 14,000 psi.

The spherical particles can have any porosity suitable to attain the desired crush strength and specific gravity. In some embodiments, the spherical particles are characterized by a porosity of about 10 to 60%. In other embodiments, the spherical particles are characterized by a porosity of about 13 to 57%, 16 to 54%, 19 to 51%, 22 to 48%, 25 to 45%, 28 to 42%, 31 to 39%, or about 34 to 36%. In some embodiments, the spherical particles can comprise a hollow core.

The spherical particles can have any size suitable to attain the desired crush strength, specific gravity, and fracture particle distribution. In some embodiments, the spherical particles are characterized by a diameter of about 0.1 to 1.7 mm. In other embodiments, the spherical particles are characterized by a diameter of about 0.1 to 1.6 mm, 0.2 to 1.6 mm, 0.3 to 1.6 mm, 0.4 to 1.6 mm, 0.5 to 1.5 mm, 0.6 to 1.4 mm, 0.7 to 1.3 mm, 0.8 to 1.2 mm, or about 0.9 to 1.1 mm. In other embodiments, the spherical particles are characterized by a diameter of about 0.3 to 0.7 mm. In some embodiments, at least about 80% of the spherical particles are characterized by a diameter within 20% of the average diameter of the spherical particles. In some embodiments, the spherical particles are characterized by a sphericity of about 0.7 to 1.0. In other embodiments, the spherical particles are characterized by a sphericity of about 0.8 to 1.0. In yet other embodiments, the spherical particles are characterized by a sphericity of about 0.9 and 1.0.

In some embodiments, the method can include heating a reaction mixture comprising a plurality of oxides and one or more additives, wherein the reaction mixture can be heated in a reactive atmosphere to a temperature below the melting point of the reaction mixture to form a powder comprising one or more reaction products. Each of the plurality of oxides can be $SiO_2$, $Al_2O_3$, $Fe_2O_3$, FeO, $Fe_3O_4$, CaO, MgO, $MnO_2$, MnO, $Na_2O$, $SO_3$, $K_2O$, $TiO_2$, $V_2O_5$, $Cr_2O_3$, SrO, $ZrO_2$, $3Al_2O_3 \cdot 2SiO_2$, $2Al_2O_3 \cdot SiO_2$, $Ca_2Mg(Si_2O_7)$, $Ca_2SiO_4$, or $CaCO_3$. In some embodiments, each of the plurality of oxides can be $SiO_2$, $Al_2O_3$, $Fe_2O_3$, FeO, $Fe_3O_4$, CaO, MgO, $MnO_2$, or MnO, and the one or more additives can be C, Al, Si, Mg, K, Fe, Na, B, O, N, $ZrO_2$, $Y_2O_3$, compounds thereof, volcanic ash, or aluminum dross. The reactive atmosphere can comprise $N_2$, $O_2$, air, $CO_2$, or combinations thereof, and the reaction mixture can be heated to a temperature of about 700 to 1,800° C. The one or more reaction products can be $Si_{6-z}Al_zO_zN_{8-z}$ where $0<z<5$, $Li_2SiN_2$, $CaSiN_2$, $MgSiN_2$, $MgB_2$, $Si_3N_4$, or yttria-stabilized zirconia (YSZ). The plurality of oxides can be present in the form of waste stream material, wherein the waste stream material can comprise metallurgical slag and fly ash, and wherein the metallurgical slag and fly ash can comprise about 20-99% (w/w) and 1-80% (w/w), respectively, of the reaction mixture. The powder can be processed to form spherical particles characterized by a specific gravity of about 1.5 to 3.0, a crush strength of at least about 10,000 psi, a sphericity of about 0.7 to 1.0, a porosity of about 10 to 60%, and a diameter of about 0.1 to 1.7 mm. The spherical particles can be coated with a coating material that can be an organic, ceramic, or nitride material.

V. Proppant Materials

The present invention provides a proppant material. In some embodiments, the proppant material includes spherical particles comprising a material selected from oxides, nitrides, oxynitrides, borides, and carbides. The spherical particles can be characterized by a specific gravity of about 1.0 to 3.0 and a crush strength of at least about 10,000 psi.

The spherical particles can have any specific gravity suitable for induced hydraulic fracturing applications. Suitable specific gravities can be close to that of water, i.e. "1". In some embodiments, the spherical particles can be characterized by a specific gravity of about 1.0 to 2.9, 1.0 to 2.8, 1.0 to 2.7, 1.0 to 2.6, 1.0 to 2.5, 1.0 to 2.4, 1.0 to 2.3, 1.0 to 2.2, 1.0 to 2.1, 1.0 to 2.0, 1.0 to 1.9, 1.0 to 1.8, 1.0 to 1.0.7, 1.0 to 1.6, 1.0 to 1.5, 1.0 to 1.4, 1.0 to 1.3, 1.0 to 1.2, or about 1.0 to 1.1. In other embodiments, the spherical particles can be characterized by a specific gravity of about 1.5 to 3.0. In still other embodiments, the spherical particles can be characterized by a specific gravity of about 1.0 to 1.7. In still other embodiments, the spherical particles can be characterized by a specific gravity of about 1.0 to 1.3 or about 2.0 to 3.0. In yet other embodiments, the spherical particles can be characterized by a specific gravity of about 1.0.

The spherical particles can have any crush strength suitable for induced hydraulic fracturing applications. In some embodiments, the spherical particles can have a crush strength of at least about 10,250 psi, 10,500 psi, 10,750 psi, 11,000 psi, 11,250 psi, 11,500 psi, 11,750 psi, 12,000 psi, 12,250 psi, 12,500 psi, 12,750 psi, 13,000 psi, 13,250 psi, 13,500 psi, 13,750 psi, or at least about 14,000 psi.

The spherical particles can have any porosity suitable to attain the desired crush strength and specific gravity. In some embodiments, the spherical particles are characterized by a porosity of about 10 to 60%. In other embodiments, the spherical particles are characterized by a porosity of about 13 to 57%, 16 to 54%, 19 to 51%, 22 to 48%, 25 to 45%, 28 to 42%, 31 to 39%, or about 34 to 36%. In some embodiments, the spherical particles can comprise a hollow core.

The spherical particles can have any size suitable to attain the desired crush strength, specific gravity, and fracture particle distribution. In some embodiments, the spherical particles are characterized by a diameter of about 0.1 to 1.7 mm. In other embodiments, the spherical particles are characterized by a diameter of about 0.1 to 1.6 mm, 0.2 to 1.6 mm, 0.3 to 1.6 mm, 0.4 to 1.6 mm, 0.5 to 1.5 mm, 0.6 to 1.4 mm, 0.7 to 1.3 mm, 0.8 to 1.2 mm, or about 0.9 to 1.1 mm. In other embodiments, the spherical particles are characterized by a diameter of about 0.3 to 0.7 mm. In some embodiments, at least about 80% of the spherical particles are characterized by a diameter within 20% of the average diameter of the spherical particles. In some embodiments, the spherical particles are characterized by a sphericity of about 0.7 to 1.0. In other embodiments, the spherical particles are characterized by a sphericity of about 0.8 to 1.0. In yet other embodiments, the spherical particles are characterized by a sphericity of about 0.9 and 1.0.

The spherical particles can also have any suitable composition. In some embodiments, the oxides can include $SiO_2$, $Al_2O_3$, $Fe_2O_3$, CaO, MgO, FeO, $Fe_3O_4$, MnO, yttria-stabilized zirconia (YSZ), and $CaCO_3$, the nitrides can include $Li_2SiN_2$, $CaSiN_2$, $MgSiN_2$, and $Si_3N_4$, the oxynitrides can include $Si_{6-z}Al_zO_zN_{8-z}$ where $0<z<5$, the borides can include $MgB_2$, and the carbides can include SiC. In some embodiments, the spherical particles can include a plurality of oxides, nitrides, oxynitrides, borides, or carbides. In some embodiments, the spherical particles can include a combination of one or more of oxides, nitrides, oxynitrides, borides, and carbides. In some embodiments, the spherical particles can be characterized by magnetic properties.

In some embodiments, the proppant material further comprises a coating on the spherical particles comprising a material that can be an organic, ceramic, or nitride material. The coating may promote containment of fines formed as the result of fracture stresses crushing the spherical particles in operation. Suitable organics include, but are not limited to, phenolic polymers and polyurethane.

In some embodiments, the proppant material can include spherical particles comprising a material that can be an oxide, nitride, oxynitride, boride, or carbide. The spherical particles can be characterized by a specific gravity of about 1.0 to 3.0, a crush strength of at least about 10,000 psi, a porosity of about 10 to 60%, a diameter of about 0.1 to 1.7 mm, and a sphericity of about 0.7 to 1.0. The oxide can be $SiO_2$, $Al_2O_3$, $Fe_2O_3$, CaO, MgO, FeO, $Fe_3O_4$, MnO, yttria-stabilized zirconia (YSZ), or $CaCO_3$, the nitride can be $Li_2SiN_2$, $CaSiN_2$, $MgSiN_2$, or $Si_3N_4$, the oxynitride can be $Si_{6-z}Al_zO_zN_{8-z}$ where $0<z<5$, the borides can be $MgB_2$, and the carbide can be SiC. The spherical particles can include a coating comprising a material that can be an organic, ceramic, or nitride material.

VI. Proppant Materials Prepared by Direct Melt Processing Method

The present invention provides a proppant material prepared by a method. In some embodiments, the method can include heating a reaction mixture comprising a plurality of oxides. The reaction mixture can be heated in a reactive atmosphere to a temperature above the melting point of the reaction mixture to form a melt. The melt can be allowed to solidify in a mold, the solidified melt being in the form of spherical particles comprising one or more of the plurality of oxides, the spherical particles being characterized by a specific gravity of about 1.5 to 3.0 and a crush strength of at least about 10,000 psi.

The plurality of oxides included in the reaction mixture can be any oxides that form proppant materials having the desired specific gravity and crush strength upon solidification. Suitable oxides include, but are not limited to, $SiO_2$, $Al_2O_3$, $Fe_2O_3$, FeO, $Fe_3O_4$, CaO, MgO, $MnO_2$, MnO, $Na_2O$, $SO_3$, $K_2O$, $TiO_2$, $V_2O_5$, $Cr_2O_3$, SrO, $ZrO_2$, $3Al_2O_3 2SiO_2$, $2Al_2O_3SiO_2$, $Ca_2Mg(Si_2O_7)$, $Ca_2SiO_4$, and $CaCO_3$. In some embodiments, each of the plurality of oxides can be $SiO_2$, $Al_2O_3$, $Fe_2O_3$, FeO, $Fe_3O_4$, CaO, MgO, $MnO_2$, or MnO.

In some embodiments, the reaction mixture can further include one or more additives. Any additives suitable for forming proppant particles of the desired composition can be used. Suitable additives include, but are not limited to, C, Al, Si, Mg, K, Fe, Na, B, O, N, $ZrO_2$, $Y_2O_3$, and compounds thereof, volcanic ash, and aluminum dross.

The reactive atmosphere in which the reaction mixture is heated can include any reactive gas suitable for forming proppant particles of the desired composition and morphology. Suitable reactive atmospheres include, but are not limited to, $N_2$, $O_2$, air, $CO_2$, and combinations thereof. In some embodiments, the reactive atmosphere can be $N_2$.

The reaction mixture can be heated to any temperature above the melting point of the reaction mixture to form the melt. In some embodiments, the reaction mixture can be heated to a temperature of about 800 to 2,500° C. In other embodiments, the reaction mixture can be heated to a temperature of about 850 to 2,450° C., 900 to 2,400° C., 950 to 2,350° C., 1,000 to 2,300° C., 1,050 to 2,250° C., 1,100 to 2,200° C., 1,150 to 2,150° C., 1,200 to 2,100° C., 1,250 to 2,050° C., 1,300 to 2,000° C., 1,350 to 1,950° C., 1,400 to 1,900° C., 1,450 to 1,850° C., 1,500 to 1,800° C., 1,550 to 1,750° C., or about 1,600 to 1,700° C. In other embodiments, the reaction mixture can be heated to a temperature of about 1,200 to 2,000° C.

The mold can comprise any suitable material on which spherical particles form upon solidification. In some embodiments, the mold can comprise graphite or molybdenum. In other embodiments, the mold can comprise graphite. In yet other embodiments, the mold can comprise a refractory material (e.g., alumina) coated with graphite or molybdenum. The mold can have any suitable dimensions. In some embodiments, the mold can comprise cylindrical holes in which the melt solidifies to form the spherical particles. In some embodiments, the melt can be introduced into the mold and then allowed to solidify. For example, the melt can be prepared in a separate crucible and then dripped into cylindrical holes of the mold where the melt cools and solidifies to form the spherical particles. In other embodiments, the reaction mixture comprising the plurality of oxides can be introduced into the mold in solid form and then heated. For example, a powder comprising the reaction mixture can be loaded into cylindrical holes of the mold where the powder is then heated to form a melt, cooled, and solidified to form the spherical particles.

In some embodiments, the plurality of oxides included in the reaction mixture are present in the form of waste stream material. Any waste stream material suitable for forming spherical particles of the desired composition and morphology can be used. Suitable waste stream materials include, but are not limited to, metallurgical slag such as air-cooled slag, pelletized slag, and granulated slag, and fly ash. In some embodiments, the waste stream material can be air-cooled slag. In other embodiments, the waste stream material can be pelletized slag. In still other embodiments, the waste stream material can be granulated slag. In yet other embodiments, the waste stream material can be fly ash. In some embodiments, the waste stream material can be aluminum dross. In some embodiments, the proppants of the present invention are formed using only waste stream material such as metallurgical slag and/or fly ash.

In some embodiments, the waste stream material comprises metallurgical slag and fly ash. Any ratio of metallurgical slag and fly ash suitable for forming spherical particles having the desired composition and morphology can be used. In some embodiments, the metallurgical slag and fly ash can comprise about 50-99% (w/w) and 1-50% (w/w), respectively, of the reaction mixture. In other embodiments, the metallurgical slag and fly ash can comprise about 1-50% (w/w) and 50-99% (w/w), respectively, of the reaction mixture. In yet other embodiments, the metallurgical slag and fly ash can comprise about 20-99% (w/w) and 1-80% (w/w), respectively, of the reaction mixture. In still other embodiments, the metallurgical slag and fly ash can comprise about 1-80% (w/w) and 20-99% (w/w), respectively, of the reaction mixture. In some embodiments, the metallurgical slag can comprise about 50-95% (w/w), 50-90% (w/w), 50-85% (w/w), 50-80% (w/w), 50-75% (w/w), 50-70% (w/w), 50-65% (w/w), or about 50-60% (w/w) of the reaction mixture. In other embodiments, the metallurgical slag can comprise about 5-50% (w/w), 10-50% (w/w), 15-50% (w/w), 20-50% (w/w), 25-50% (w/w), 30-50% (w/w), 35-50% (w/w), or about 40-50% (w/w) of the reaction mixture. In some embodiments, the fly ash can comprise about 5-50% (w/w), 10-50% (w/w), 15-50% (w/w), 20-50% (w/w), 50% (w/w), 30-50% (w/w), 35-50% (w/w), or about 40-50% (w/w) of the reaction mixture. In other embodiments, the fly ash can comprise about 50-95% (w/w), 50-90% (w/w), 50-85% (w/w), 50-80% (w/w), 50-75% (w/w), 50-70% (w/w), 50-65% (w/w), or about 50-60% (w/w) of the reaction mixture. In still other embodiments, the metallurgical slag and fly ash can comprise about 95% (w/w) and 5% (w/w), respectively, of the reaction mixture. In yet other embodiments, the metallurgical slag and fly ash can comprise about 80% (w/w) and 20% (w/w), respectively, of the reaction mixture.

The spherical particles formed upon solidification can have any suitable composition. In some embodiments, the spherical particles can comprise one or more oxides. For example, in some embodiments, the one or more oxides can be from the plurality of oxides included in the reaction mixture. In other embodiments, the one or more oxides can instead be formed as a result of heating the reaction mixture in the reactive atmosphere. Suitable oxides include, but are not limited to, $SiO_2$, $Al_2O_3$, $Fe_2O_3$, CaO, MgO, FeO, $Fe_3O_4$, MnO, yttria-stabilized zirconia (YSZ), and $CaCO_3$. In some embodiments, the spherical particles can be characterized by magnetic properties.

In some embodiments, the method can further include coating the spherical particles with a material that can be an organic, nitride, or ceramic material. The coating may promote containment of fines formed as the result of fracture stresses crushing the spherical particles in operation. Suitable organics include, but are not limited to, phenolic polymers and polyurethane.

The spherical particles can have any specific gravity suitable for induced hydraulic fracturing applications. Suitable specific gravities can be close to that of water, i.e. "1". In some embodiments, the spherical particles can be characterized by a specific gravity of about 1.5 to 2.9, 1.6 to 2.8, 1.7 to 2.7, 1.8 to 2.6, 1.9 to 2.5, 2.0 to 2.4, or about 2.1 to 2.3. In other embodiments, the spherical particles can be characterized by a specific gravity of about 2.0 to 3.0.

The spherical particles can have any crush strength suitable for induced hydraulic fracturing applications. In some embodiments, the spherical particles can have a crush strength of at least about 10,250 psi, 10,500 psi, 10,750 psi, 11,000 psi, 11,250 psi, 11,500 psi, 11,750 psi, 12,000 psi, 12,250 psi, 12,500 psi, 12,750 psi, 13,000 psi, 13,250 psi, 13,500 psi, 13,750 psi, or at least about 14,000 psi.

The spherical particles can have any porosity suitable to attain the desired crush strength and specific gravity. In some embodiments, the spherical particles are characterized by a porosity of about 10 to 60%. In other embodiments, the spherical particles are characterized by a porosity of about 13 to 57%, 16 to 54%, 19 to 51%, 22 to 48%, 25 to 45%, 28 to 42%, 31 to 39%, or about 34 to 36%. In some embodiments, the spherical particles can comprise a hollow core.

The spherical particles can have any size suitable to attain the desired crush strength, specific gravity, and fracture particle distribution. In some embodiments, the spherical particles are characterized by a diameter of about 0.1 to 1.7 mm. In other embodiments, the spherical particles are characterized by a diameter of about 0.1 to 1.6 mm, 0.2 to 1.6 mm, 0.3 to 1.6 mm, 0.4 to 1.6 mm, 0.5 to 1.5 mm, 0.6 to 1.4 mm, 0.7 to 1.3 mm, 0.8 to 1.2 mm, or about 0.9 to 1.1 mm.

In other embodiments, the spherical particles are characterized by a diameter of about 0.3 to 0.7 mm. In some embodiments, at least about 80% of the spherical particles are characterized by a diameter within 20% of the average diameter of the spherical particles. In some embodiments, the spherical particles are characterized by a sphericity of about 0.7 to 1.0. In other embodiments, the spherical particles are characterized by a sphericity of about 0.8 to 1.0. In yet other embodiments, the spherical particles are characterized by a sphericity of about 0.9 and 1.0.

VII. Proppant Materials Prepared by Reaction Product Initiation Methods

The present invention provides a proppant material prepared by a method. In some embodiments, the method can include heating a reaction mixture comprising a plurality of oxides and one or more additives. The reaction mixture can be heated in a reactive atmosphere to a temperature below the melting point of the reaction mixture to form a powder comprising one or more reaction products. The powder can be processed to form spherical particles comprising an oxide, nitride, oxynitride, boride, or carbide, the spherical particles being characterized by a specific gravity of about 1.0 to 1.7 and a crush strength of at least about 10,000 psi.

The plurality of oxides included in the reaction mixture can be any oxides that react to form the desired reaction products. Suitable oxides include, but are not limited to, $SiO_2$, $Al_2O_3$, $Fe_2O_3$, FeO, $Fe_3O_4$, CaO, MgO, $MnO_2$, MnO, $Na_2O$, $SO_3$, $K_2O$, $TiO_2$, $V_2O_5$, $Cr_2O_3$, SrO, $ZrO_2$, $3Al_2O_3 2SiO_2$, $2Al_2O_3 SiO_2$, $Ca_2Mg(Si_2O_7)$, $Ca_2SiO_4$, and $CaCO_3$. In some embodiments, each of the plurality of oxides can be $SiO_2$, $Al_2O_3$, $Fe_2O_3$, FeO, $Fe_3O_4$, CaO, MgO, $MnO_2$, or MnO.

The reaction mixture can include any additives suitable for forming proppant particles of the desired composition. Suitable additives include, but are not limited to, C, Al, Si, Mg, K, Fe, Na, B, O, N, $ZrO_2$, $Y_2O_3$, and compounds thereof, volcanic ash, and aluminum dross.

The reactive atmosphere in which the reaction mixture is heated can include any reactive gas suitable for forming proppant particles of the desired composition. Suitable reactive atmospheres include, but are not limited to, $N_2$, $O_2$, air, $CO_2$, and combinations thereof. In some embodiments, the reactive atmosphere can be $N_2$.

The one or more reaction products included in the powder formed by heating the reaction mixture in the reactive atmosphere can have any suitable composition. In some embodiments, the one or more reaction products can be an oxide, a nitride, an oxynitride, a boride, or a carbide. In other embodiments, the reaction products can be $Si_{6-z}Al_zO_zN_{8-z}$ where $0<z<5$, $Li_2SiN_2$, $CaSiN_2$, $MgSiN_2$, $MgB_2$, $Si_3N_4$, or yttria-stabilized zirconia (YSZ). In some embodiments, the spherical particles can be characterized by magnetic properties.

The reaction mixture can be heated to any temperature below the melting point of the reaction mixture suitable for forming the desired one or more reaction products. In some embodiments, the reaction mixture is heated to a temperature of about 700 to 1,800° C. In other embodiments, the reaction mixture can be heated to a temperature of about 800 to 1,700° C., 900 to 1,600° C., 1,000 to 1,500° C., 1,100 to 1,400° C., or about 1,200 to 1,300° C.

In some embodiments, the plurality of oxides included in the reaction mixture are present in the form of waste stream material. Any waste stream material suitable for forming spherical particles of the desired composition can be used. Suitable waste stream materials include, but are not limited to, metallurgical slag such as air-cooled slag, pelletized slag, and granulated slag, and fly ash. In some embodiments, the waste stream material can be air-cooled slag. In other embodiments, the waste stream material can be pelletized slag. In still other embodiments, the waste stream material can be granulated slag. In yet other embodiments, the waste stream material can be fly ash. In still other embodiments, the waste stream material can be aluminum dross.

In some embodiments, the waste stream material comprises metallurgical slag and fly ash. Any ratio of metallurgical slag and fly ash suitable for forming spherical particles having the desired composition and morphology can be used. In some embodiments, the metallurgical slag and fly ash can comprise about 50-99% (w/w) and 1-50% (w/w), respectively, of the reaction mixture. In other embodiments, the metallurgical slag and fly ash can comprise about 1-50% (w/w) and 50-99% (w/w), respectively, of the reaction mixture. In yet other embodiments, the metallurgical slag and fly ash can comprise about 20-99% (w/w) and 1-80% (w/w), respectively, of the reaction mixture. In still other embodiments, the metallurgical slag and fly ash can comprise about 1-80% (w/w) and 20-99% (w/w), respectively, of the reaction mixture. In some embodiments, the metallurgical slag can comprise about 50-95% (w/w), 50-90% (w/w), 50-85% (w/w), 50-80% (w/w), 50-75% (w/w), 50-70% (w/w), 50-65% (w/w), or about 50-60% (w/w) of the reaction mixture. In other embodiments, the metallurgical slag can comprise about 5-50% (w/w), 10-50% (w/w), 15-50% (w/w), 20-50% (w/w), 25-50% (w/w), 30-50% (w/w), 35-50% (w/w), or about 40-50% (w/w) of the reaction mixture. In some embodiments, the fly ash can comprise about 5-50% (w/w), 10-50% (w/w), 15-50% (w/w), 20-50% (w/w), 50% (w/w), 30-50% (w/w), 35-50% (w/w), or about 40-50% (w/w) of the reaction mixture. In other embodiments, the fly ash can comprise about 50-95% (w/w), 50-90% (w/w), 50-85% (w/w), 50-80% (w/w), 50-75% (w/w), 50-70% (w/w), 50-65% (w/w), or about 50-60% (w/w) of the reaction mixture. In still other embodiments, the metallurgical slag and fly ash can comprise about 95% (w/w) and 5% (w/w), respectively, of the reaction mixture. In yet other embodiments, the metallurgical slag and fly ash can comprise about 80% (w/w) and 20% (w/w), respectively, of the reaction mixture.

In some embodiments, the one or more reaction products can comprise an oxide, and processing the powder can include contacting the one or more reaction products with an etchant to remove the oxide. For example, in some embodiments, the reaction mixture can include $SiO_2$ and a nitride additive such as $Li_3N$, $Ca_3N_2$, or $Mg_3N_2$. When heated in an $N_2$ reactive atmosphere, reaction products including silicon nitrides (e.g., $Li_xSi_yN_z$, $CaSiN_2$, or $MgSiN_2$) and oxides (e.g., $Li_2O$, CaO, or MgO) can be formed. If the silicon nitride is the desired material, the oxide reaction product can be removed using an etchant. In some embodiments, etchants can be used to remove non-oxide reaction products, in addition to any remaining oxides and other materials that were present in the reaction mixture prior to heating. Any etchant suitable for removing undesired material in the formed powder while preserving the desired material can be used in embodiments of the invention. Suitable etchants include, but are not limited to, hydrochloric acid, hydrofluoric acid, sodium hydroxide, phosphoric acid, nitric acid, and ammonium fluoride.

In some embodiments, processing the powder can include heating the powder in a non-reactive atmosphere to a temperature above the melting point of the powder to form a melt, and allowing the melt to solidify in a mold, the solidified melt being in the form of the spherical particles.

The mold can comprise any suitable material on which spherical particles form upon solidification. In some embodiments, the mold can comprise graphite or molybdenum. In other embodiments, the mold can comprise graphite In yet other embodiments, the mold can comprise a refractory material (e.g., alumina) coated with graphite or molybdenum. The mold can have any suitable dimensions. In some embodiments, the mold can comprise cylindrical holes in which the melt solidifies to form the spherical particles. In some embodiments, the melt can be introduced into the mold and then allowed to solidify. For example, the melt can be prepared in a separate crucible and then dripped into cylindrical holes of the mold where the melt cools and solidifies to form the spherical particles. In other embodiments, the formed powder comprising the one or more reaction products can be introduced into the mold in solid form and then heated. For example, the powder can be loaded into cylindrical holes of the mold where the powder is then heated to form a melt, cooled, and solidified to form the spherical particles.

In some embodiments, processing the powder can include forming a slurry comprising the powder, coating templating particles with the slurry, and heating the coated templating particles to consume the templating particles and form the spherical particles. Any suitable templating particle material and heating temperature can be used. In some embodiments, the templating particles can comprise a material that is glass, polystyrene, or cellulose, and the coated templating particles can be heated to a temperature of about 60 to 500° C. to form the spherical particles comprising a hollow core. In some embodiments, the templating particles can comprise glass. In some embodiments, the templating particles can comprise polystyrene. In some embodiments, the templating particles can comprise cellulose. For example, the templating particles can comprise walnut shell. In some embodiments, the coated templating particles can be heated to a temperature of about 100 to 450° C., 150 to 400° C., 200 to 350° C., or about 250 to 300° C. to form the spherical particles comprising the hollow core. In other embodiments, the coated templating particles can be heated to a temperature of about 60° C. to form the spherical particles comprising the hollow core. In still other embodiments, the coated templating particles can be heated to a temperature of about 300° C. to form the spherical particles comprising a hollow core. In yet other embodiments, the coated templating particles can be heated to a temperature of about 500° C. to form the spherical particles comprising the hollow core. In some embodiments, the spherical particles comprising the hollow core can be sintered at a temperature of about 500 to 2,000° C. in a reactive atmosphere comprising $N_2$, $O_2$, air, $CO_2$, or combinations thereof. In some embodiments, the spherical particles comprising the hollow core can be sintered at a temperature of about 600 to 1,900° C., 700 to 1,800° C., 800 to 1,700° C., 900 to 1,600° C., 1,000 to 1,500° C., 1,100 to 1,400° C., or about 1,200 to 1,300° C.

In some embodiments, the method can further include coating the spherical particles with a material that can be an organic, nitride, or ceramic material. The coating may promote containment of fines formed as the result of fracture stresses crushing the spherical particles in operation. Suitable organics include, but are not limited to, phenolic polymers and polyurethane.

The spherical particles can have any specific gravity suitable for induced hydraulic fracturing applications. Suitable specific gravities can be close to that of water, i.e. "1". In some embodiments, the spherical particles can be characterized by a specific gravity of about 1.1 to 1.6, 1.2 to 1.5, or about 1.3 to 1.4. In other embodiments, the spherical particles can be characterized by a specific gravity of about 1.0 to 1.3.

The spherical particles can have any crush strength suitable for induced hydraulic fracturing applications. In some embodiments, the spherical particles can have a crush strength of at least about 10,250 psi, 10,500 psi, 10,750 psi, 11,000 psi, 11,250 psi, 11,500 psi, 11,750 psi, 12,000 psi, 12,250 psi, 12,500 psi, 12,750 psi, 13,000 psi, 13,250 psi, 13,500 psi, 13,750 psi, or at least about 14,000 psi.

The spherical particles can have any porosity suitable to attain the desired crush strength and specific gravity. In some embodiments, the spherical particles are characterized by a porosity of about 10 to 60%. In other embodiments, the spherical particles are characterized by a porosity of about 13 to 57%, 16 to 54%, 19 to 51%, 22 to 48%, 25 to 45%, 28 to 42%, 31 to 39%, or about 34 to 36%. In some embodiments, the spherical particles can comprise a hollow core.

The spherical particles can have any size suitable to attain the desired crush strength, specific gravity, and fracture particle distribution. In some embodiments, the spherical particles are characterized by a diameter of about 0.1 to 1.7 mm. In other embodiments, the spherical particles are characterized by a diameter of about 0.1 to 1.6 mm, 0.2 to 1.6 mm, 0.3 to 1.6 mm, 0.4 to 1.6 mm, 0.5 to 1.5 mm, 0.6 to 1.4 mm, 0.7 to 1.3 mm, 0.8 to 1.2 mm, or about 0.9 to 1.1 mm. In other embodiments, the spherical particles are characterized by a diameter of about 0.3 to 0.7 mm. In some embodiments, at least about 80% of the spherical particles are characterized by a diameter within 20% of the average diameter of the spherical particles. In some embodiments, the spherical particles are characterized by a sphericity of about 0.7 to 1.0. In other embodiments, the spherical particles are characterized by a sphericity of about 0.8 to 1.0. In yet other embodiments, the spherical particles are characterized by a sphericity of about 0.9 and 1.0.

VIII. EXAMPLES

Example 1: Producing Proppant Material from Direct Melt Processing of Waste Stream Materials This example provides a method according to the present invention of producing a proppant material in the form of spherical beads by direct melting of oxide-rich waste stream materials.

Various ratios and morphologies of waste stream materials were used, including blast furnace slag (from Arcelor-Mittal) and fly ash with low CaO concentrations, "low-Ca fly ash," (from Boral). The powder samples included the following compositions by weight: 80% air-cooled slag/20% low-Ca fly ash, 95% air-cooled slag/5% low-Ca fly ash, 100% air-cooled slag, 100% pelletized slag, and 100% granulated slag. Prior to melting, the powder samples were ball milled for about 15 minutes using steel ball bearings in a steel vial and using a SPEX high energy ball mill.

Melting was carried out in a graphite crucible including round bottom holes that were machined to have a diameter of approximately 1.5 mm. The milled powder samples were placed in the holes in various amounts to achieve target bead diameters in the range of approximately 0.5 to 1.5 mm. The powders were pre-heated to temperatures in the 60 to 700° C. range in near-vacuum conditions using an RF induction coil, and then melted under nitrogen cover gas using the RF induction coil to temperatures of approximately 1200 to 1600° C. The time at maximum temperature ranged from approximately 20 seconds to 2 minutes.

FIGS. 8A-8B show an exemplary powder sample before and after melting. FIG. 8A shows the graphite crucible with the powder loaded before melting, FIG. 8B shows the spherical beads in the graphite crucible holes after melting. FIGS. 9A-9F show exemplary molten beads. FIG. 9A shows an optical photograph of a single molten bead comprising 80% (w/w) air-cooled slag and 20% (w/w) low-Ca fly ash, FIG. 9B shows an SEM cross-sectional image of the molten bead, and FIG. 9C shows a close-up SEM cross-sectional image of the molten bead. FIGS. 9D-9E show optical photographs of molten beads comprising 100% (w/w) pelletized slag, and FIG. 9F shows a cross-sectional SEM image of a molten bead comprising 100% (w/w) pelletized slag.

The molten beads appeared to be non-reactive with graphite, with sphere formation occurring due to the surface energy of the melt being relatively high as compared to the graphite, thereby resulting in non-wetting conditions.

A diametral compression test was used to measure the fracture strength of the spherical beads formed from the various ratios and morphologies of waste stream material. This test involved crushing individual proppant beads between two platens. The diametral strength of each bead was calculated using the following equation:

$$\frac{\text{Failure Load} \times 1.4}{2 \times \pi \times \text{bead radius}^2}$$

FIG. 10 shows a table of spherical bead compositions, diameters, and strength measurements for the tested samples formed from waste stream materials. Commercially available silica, ceramic, and glass proppants were also tested, and the resulting data for these materials is shown in FIG. 10 for purposes of comparison.

The morphology of the formed beads varied based on the waste stream material ratios used for each samples. For example, samples including 100% air-cooled slag and 80% air-cooled slag/20% low-Ca fly ash were characterized by a more solid, less porous composition. Surprisingly, samples including 95% air-cooled slag/5% low-Ca fly ash formed hollow beads upon solidification. Without being bound to any particular theory, the void may be formed by a gas releasing chemical reaction whose origin is likely in the low-Ca fly ash. The samples with higher concentrations of low-Ca fly ash expanded and then contracted due to the beads bursting. In contrast, such bursting was not observed during solidification of the beads including only 5% low-Ca ash, with the gaseous reaction product instead forming a hollow core. FIG. 11A shows a photograph of a hollow spherical bead, and FIG. 11B shows a cross-sectional SEM image of the bead and hollow core. Additionally, some of the formed beads were characterized by a composite-like structure as seen in FIGS. 9D and 9F.

It was also surprisingly discovered that the solidified beads demonstrated magnetic properties. Without being bound by any particular theory, the magnetism of the beads may be due to $Fe_3O_4$ phases forming during solidification. Such magnetic properties may be useful as a tracer to detect the position and distribution of proppant particles in a hydraulically induced fracture.

Example 2: Producing Proppant Material from Reaction Product Initiation

This example provides a method according to the present invention of producing a proppant material comprising $MgSiN_2$ using low-Ca fly ash and $Mg_3N_2$ additives.

Low-Ca fly ash containing $SiO_2$ was mixed in stoichiometric amount with $Mg_3N_2$. The mixture was ball milled for one hour to homogenize using a SPEX high energy mixer mill with 2⁷⁄₁₆" tungsten carbide ball bearings. The homogenized powder was then loaded into a graphite die and cold pressed. The die was then loaded into a hot press with no additional force applied and then heated in a nitrogen atmosphere. The hot press profile for the heating is shown in FIG. 16A. During heating, the following reaction occurred in the material:

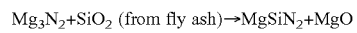

$Mg_3N_2 + SiO_2$ (from fly ash) → $MgSiN_2 + MgO$

As shown in FIG. 16B, XRD characterization data indicated the presence of the target $MgSiN_2$ in the material after heating. The MgO reaction product was etched using 1M HCl in a process involving two cycles of stirring for 15 to 60 minutes, centrifuging, and decanting of the supernatant.

Example 3: Producing Proppant Material from Reaction Product Initiation by Vacuum Drying and Templating Processes This example provides a method according to the present invention of producing a proppant material in the form of spherical beads comprising $Si_{6-z}Al_zO_zN_{8-z}$ precursors using low-Ca fly ash and $Al_2O_3$ additives, the method including vacuum drying and templating processes.

Walnut shells having a size of 200 to 700 microns were etched with 6M HCl. The etched walnut shells were then coated in a slurry comprising water and 1% (w/w) polyacrylamide. A 50/50 (w/w) mixture of low-Ca fly ash and $Al_2O_3$ were mixed and ball milled using a SPEX high energy mixer mill to form a powder mixture. The coated walnut shells were then dry coated with the fly ash/$Al_2O_3$ powder by rolling the coated walnut shells in the powder. The dry-coated walnut shells were dispersed in an $SiO_2$ sol-gel mixture comprising tetraethylorthosilicate (or silanol terminated polymer), water, and an ammonium hydroxide catalyst, and then dried in a vacuum oven at 60° C. for approximately 2 hours to remove the solvent. FIG. 12 shows the beads post-drying. Upon heating the formed beads to temperatures around 1,400° C. in a reactive environment (e.g., $N_2$), the precursors can react to from $Si_{6-z}Al_zO_zN_{8-z}$ with the heat burning off the walnut shell core, thereby forming hollow proppant particles comprising $Si_{6-z}Al_zO_zN_{8-z}$.

Example 4: Producing Proppant Material from Reaction Product Initiation by Controlled Thermal Treatments and Templating Processes This example provides a method according to the present invention of producing a proppant material in the form of spherical beads comprising $Si_{6-z}Al_zO_zN_{8-z}$ precursors using low-Ca fly ash and $Al_2O_3$ additives, the method including controlled thermal treatments and templating processes.

Walnut shells 500 microns in size were etched with 6M HCl. A 50/50 (w/w) mixture of low-Ca fly ash and $Al_2O_3$ was prepared separately by ball milling using a SPEX high energy mixer mill to form a powder mixture. A 4% (w/w) high MW methyl cellulose polymer was added to the precursor mixture, and the precursor/polymer mixture was dry-coated coated onto the etched walnut shells via shear mixing. An $SiO_2$ sol-gel coating was then applied and the coated shells dried in a similar fashion as described above in Example 3. The resulting coated particles are shown in FIG. 13A.

A heat treatment was then performed under nitrogen cover gas in which the coated particles were heated from room temperature up to 200° C. at 5° C./minute, then ramped up to 300° C. at 1° C./minute and then held at 300° C. for approximately 30 minutes. As shown in FIG. 13B, the resulting material included coated hollow shells due to the walnut shells being burned off during the controlled thermal treatments.

Example 5: Producing Proppant Material from Reaction Product Initiation by Annealing and Templating Processes This example provides a method according to the present invention of producing a proppant material in the form of spherical beads comprising $Si_{6-z}Al_zO_zN_{8-z}$, the method including annealing and templating processes.

Similar to Example 4, walnut shells 500 microns in size were etched with 6M HCl. A mixture of $Si_{6-z}Al_zO_zN_{8-z}$ powder and 4% (w/w) high MW methyl cellulose polymer was prepared, and then dry-coated coated onto the etched walnut shells via shear mixing. The coated shells were dried in a similar fashion as described above in Example 3. The resulting coated particles are shown in FIG. 14A.

Multiple annealing treatments were then performed under nitrogen cover gas in which one sample of coated particles was heated from room temperature up to 300° C. at 30° C. minute, held at 300° C. for approximately 30 minutes, and then cooled down to room temperature at 8° C./minute. Another sample of coated particles was heated from room temperature up to 500° C. at 30° C. minute, held at 500° C. for approximately 30 minutes, and then cooled down to room temperature at 8° C./minute. The $Si_{6-z}Al_zO_zN_{8-z}$ proppant beads heated to 300° C. are shown in FIG. 14B, and the $Si_{6-z}Al_zO_zN_{8-z}$ proppant beads heated to 500° C. are shown in FIG. 14C.

Example 6: Producing Proppant Material by Rapid Freezing

This example provides a method according to the present invention of producing a proppant material in the form of spherical beads comprising $Si_{6-z}Al_zO_zN_{8-z}$, the method including rapid freezing processes.

A suspension was prepared comprising $Si_{6-z}Al_zO_zN_{8-z}$, 1% (w/w) methyl cellulose polymer, and water. Beads of SiAlON were dropped directly into liquid nitrogen and then immediately vacuum dried at 200° C. The dried beads are shown in FIG. 15A, which were then heated in the vacuum oven from room temperature to 250° C. at 5° C./minute, heated from 250° C. to 350° C. at 1° C./min, and held at 350° C. for about 30 minutes. The beads were then further heated in a hot press and under nitrogen cover gas from 350° C. to 1,750° C. at 5° C./minute, held at 1,750° C. for approximately 30 minutes, and then cooled down to room temperature at 10° C./minute. The resulting $Si_{6-z}Al_zO_zN_{8-z}$ proppant beads are shown in FIG. 15B.

Although the foregoing invention has been described in some detail by way of illustration and example for purposes of clarity of understanding, one of skill in the art will appreciate that certain changes and modifications can be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A method of preparing a proppant material comprising:
heating a reaction mixture comprising a plurality of oxides from a combination of metallurgical slag and flyash, wherein the reaction mixture is in a mold and is heated in a reactive atmosphere to a temperature above the melting point of the reaction mixture to form a melt; and
allowing the melt to solidify in the mold, wherein the solidified melt is in the form of spherical particles characterized by a specific gravity of about 1.5 to 2.0, a porosity of about 16 to 54%, an average diameter of about 0.1 to 1.7 mm, and a crush strength of at least about 10,000 psi, wherein at least about 80% of the spherical particles are characterized by a diameter within 20% of the average diameter, thereby preparing the proppant material.

2. The method of claim 1, wherein each of the plurality of oxides is selected from the group consisting of $SiO_2$, $Al_2O_3$, $Fe_2O_3$, FeO, $Fe_3O_4$, CaO, MgO, $MnO_2$, MnO, $Na_2O$, $SO_3$, $K_2O$, $TiO_2$, $V_2O_5$, $Cr_2O_3$, SrO, $ZrO_2$, $3Al_2O_32SiO_2$, $2Al_2O_3SiO_2$, $Ca_2Mg(Si_2O_7)$, $Ca_2SiO_4$, and $CaCO_3$.

3. The method of claim 1, wherein the reaction mixture further comprises one or more additives selected from the group consisting of C, Al, Si, Mg, K, Fe, Na, B, O, N, $ZrO_2$, $Y_2O_3$, volcanic ash, and aluminum dross.

4. The method of claim 1, wherein the reactive atmosphere comprises $N_2$, $O_2$, air, $CO_2$, or combinations thereof.

5. The method of claim 1, wherein the reaction mixture is heated to a temperature of about 800 to 2,500° C.

6. The method of claim 1, wherein the plurality of oxides are present in the form of waste stream material.

7. The method of claim 1, wherein the reaction mixture further comprises aluminum dross.

8. The method of claim 1, wherein the plurality of oxides comprises about 20-99% metallurgical slag and 1-80% flyash, by weight.

9. The method of claim 1, wherein the spherical particles are characterized by a sphericity of about 0.7 to 1.0.

10. The method of claim 1, further comprising:
loading a powder comprising the reaction mixture into the mold prior to heating the reaction mixture.

11. The method of claim 1, wherein at least a portion of the spherical particles comprise a hollow core.

12. The method of claim 1, further comprising coating the spherical particles with a material comprising an organic material, a ceramic material, or a nitride material.

13. The method of claim 12, wherein the organic material comprises a phenolic polymer, a polyurethane, or both.

14. A method of preparing a proppant material comprising:
heating a reaction mixture comprising a plurality of oxides from a combination of metallurgical slag and flyash, wherein the reaction mixture is heated in a reactive atmosphere to a temperature above the melting point of the reaction mixture to form a melt; and
allowing the melt to solidify, thereby preparing the proppant material, wherein the proppant material is in the form of spherical particles characterized by a specific gravity of about 1.0 to 2.0, a crush strength of at least about 10,000 psi, a porosity of about 16 to 54%, an average diameter of about 0.1 to 1.7 mm, and a sphericity of about 0.7 to 1.0, wherein at least about 80% of the spherical particles are characterized by a diameter within 20% of the average diameter.

15. The method of claim 14, wherein each of the plurality of oxides is selected from the group consisting of $SiO_2$, $Al_2O_3$, $Fe_2O_3$, FeO, $Fe_3O_4$, CaO, MgO, $MnO_2$, MnO, $Na_2O$, $SO_3$, $K_2O$, $TiO_2$, $V_2O_5$, $Cr_2O_3$, SrO, $ZrO_2$, $3Al_2O_3 \cdot 2SiO_2$, $2Al_2O_3 \cdot SiO_2$, $Ca_2Mg(Si_2O_7)$, $Ca_2SiO_4$, and $CaCO_3$.

16. The method of claim 14, wherein the reaction mixture further comprises one or more additives selected from the group consisting of C, Al, Si, Mg, K, Fe, Na, B, O, N, $ZrO_2$, $Y_2O_3$, volcanic ash, and aluminum dross.

17. The method of claim 14, wherein the reactive atmosphere comprises $N_2$, $O_2$, air, $CO_2$, or combinations thereof.

18. The method of claim 14, wherein at least a portion of the spherical particles comprise a hollow core.

19. The method of claim 14, further comprising coating the spherical particles with a material comprising an organic material, a ceramic material, or a nitride material.

20. The method of claim 19, wherein the organic material comprises a phenolic polymer, a polyurethane, or both.

* * * * *